(12) United States Patent
Vavintaparthi et al.

(10) Patent No.: US 12,062,161 B2
(45) Date of Patent: Aug. 13, 2024

(54) AREA EFFICIENT HIGH DYNAMIC RANGE BANDWIDTH COMPRESSION

(71) Applicant: QUALCOMM Incorporated, San Diego, CA (US)

(72) Inventors: Nageswara Rao Vavintaparthi, Bangalore (IN); Shridhar Prakash Patil, Chikkodi (IN); Joby Abraham, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/061,958

(22) Filed: Dec. 5, 2022

(65) Prior Publication Data
US 2024/0185401 A1    Jun. 6, 2024

(51) Int. Cl.
| | | |
|---|---|---|
| *G06T 5/77* | (2024.01) | |
| *G06T 5/50* | (2006.01) | |
| *H04N 5/265* | (2006.01) | |
| *H04N 23/71* | (2023.01) | |
| *H04N 23/72* | (2023.01) | |
| *H04N 23/73* | (2023.01) | |
| *H04N 23/741* | (2023.01) | |
| *H04N 23/743* | (2023.01) | |

(52) U.S. Cl.
CPC .................. *G06T 5/77* (2024.01); *G06T 5/50* (2013.01); *H04N 5/265* (2013.01); *H04N 23/71* (2023.01); *H04N 23/72* (2023.01); *H04N 23/73* (2023.01); *H04N 23/741* (2023.01); *H04N 23/743* (2023.01); *G06T 2207/20221* (2013.01)

(58) Field of Classification Search
CPC ... G06T 5/77; G06T 5/50; G06T 2207/20221; H04N 5/265; H04N 23/71; H04N 23/72; H04N 23/73; H04N 23/741; H04N 23/743
See application file for complete search history.

(56) References Cited

U.S. PATENT DOCUMENTS

| | | | | |
|---|---|---|---|---|
| 10,467,732 | B2 * | 11/2019 | Dewhurst | ............ H04N 23/741 |
| 2011/0150357 | A1 | 6/2011 | Prentice | |

(Continued)

FOREIGN PATENT DOCUMENTS

JP    2002223350 A    8/2002

OTHER PUBLICATIONS

International Search Report and Written Opinion—PCT/US2023/076595—ISA/EPO—Feb. 28, 2024.

*Primary Examiner* — Luong T Nguyen
(74) *Attorney, Agent, or Firm* — Polsinelli/Qualcomm

(57) ABSTRACT

Techniques are described herein for processing image data. For instance, a technique can include obtaining a first image having a first exposure time and a second image having a second exposure time that is greater than the first exposure time. The technique can further include determining at least one of: that a first pixel of the first image has a first pixel value below a first threshold value; or that a second pixel of the second image has a second pixel value above a second threshold value; suppressing at least one of the first pixel or the second pixel based on the determination so as to prevent storing the first pixel or the second pixel; replacing the suppressed first pixel or second pixel based on a another pixel value; and outputting the first image or the second image, the first image or the second image including the another pixel.

30 Claims, 12 Drawing Sheets

(56) References Cited

U.S. PATENT DOCUMENTS

| | | | |
|---|---|---|---|
| 2015/0244916 A1* | 8/2015 | Kang | H04N 23/741 |
| | | | 348/222.1 |
| 2018/0082408 A1 | 3/2018 | Dewhurst | |
| 2020/0211166 A1* | 7/2020 | Yao | G06T 3/18 |
| 2021/0243348 A1* | 8/2021 | Heo | H04N 23/71 |
| 2022/0414847 A1* | 12/2022 | Kwon | G06T 5/50 |
| 2023/0388654 A1 | 11/2023 | Dey et al. | |

\* cited by examiner

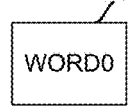
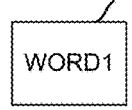
FIG. 10

1100

```
┌─────────────────────────────────────────────┐
│ Obtain A First Image Having A First Exposure Time And A │
│ Second Image Having A Second Exposure Time, Wherein │
│ The Second Exposure Time Is Greater Than The First │
│ Exposure Time │
│ 1102 │
└─────────────────────────────────────────────┘
                       ↓
┌─────────────────────────────────────────────┐
│ Determine At Least One Of: That A First Pixel Of The First │
│ Image Has A First Pixel Value Below A First Threshold │
│ Value; Or That A Second Pixel Of The Second Image Has A │
│ Second Pixel Value Above A Second Threshold Value │
│ 1104 │
└─────────────────────────────────────────────┘
                       ↓
┌─────────────────────────────────────────────┐
│ Suppress At Least One Of The First Pixel Or The Second │
│ Pixel Based On The Determination That The First Pixel Has │
│ A First Pixel Value Below The First Threshold Value Or That │
│ The Second Pixel Has A Second Pixel Value Above The │
│ Second Threshold Value To Prevent Storing The First Pixel │
│ Or The Second Pixel To The At Least One Memory │
│ 1106 │
└─────────────────────────────────────────────┘
                       ↓
┌─────────────────────────────────────────────┐
│ Replace At Least One Of: The Suppressed First Pixel Of │
│ The First Image Based On A Third Pixel Value Of A │
│ Corresponding Third Pixel From A First Additional Image; │
│ Or The Suppressed Second Pixel Of The First Image Based │
│ On A Third Fourth Pixel Value Of A Corresponding Third │
│ Fourth Pixel From A Second Additional Image │
│ 1108 │
└─────────────────────────────────────────────┘
                       ↓
┌─────────────────────────────────────────────┐
│ Output The First Image Or The Second Image, The First │
│ Image Or The Second Image Including The Third Pixel Or │
│ The Fourth Pixel │
│ 1110 │
└─────────────────────────────────────────────┘
```

FIG. 11

AREA EFFICIENT HIGH DYNAMIC RANGE BANDWIDTH COMPRESSION

TECHNICAL FIELD

The present disclosure generally relates to image processing. For example, aspects of the present disclosure relate to systems and techniques for performing an area efficient high dynamic range (HDR) based bandwidth compression, which can reduce power and bandwidth used by an image processing system when generating images, such as HDR and other images.

BACKGROUND

A camera is a device that receives light and captures image frames, such as still images or video frames, using an image sensor. Cameras may include one or more processors, such as image signal processors (ISPs), that can process one or more image frames captured by an image sensor. For example, a raw image frame captured by an image sensor can be processed by an image signal processor (ISP) to generate a final image. Cameras can be configured with a variety of image capture and image processing settings to alter the appearance of an image. Some camera settings are determined and applied before or while an image is captured, such as ISO, exposure time (also referred to as exposure duration), aperture size, f/stop, shutter speed, focus, and gain, among others. Moreover, some camera settings can be configured for post-processing of an image, such as alterations to a contrast, brightness, saturation, sharpness, levels, curves, and colors, among others.

BRIEF SUMMARY

Systems and techniques are described herein for reducing a power and bandwidth used by an image processing system to generate an image, such as an HDR image. In one illustrative example, an apparatus for processing image data is provided that includes at least one memory and at least one processor coupled to the at least one memory. The at least one processor is configured to: obtain a first image having a first exposure time and a second image having a second exposure time, wherein the second exposure time is greater than the first exposure time; determine at least one of: that a first pixel of the first image has a first pixel value below a first threshold value; or that a second pixel of the second image has a second pixel value above a second threshold value; suppress at least one of the first pixel or the second pixel based on the determination that the first pixel has a first pixel value below the first threshold value or that the second pixel has a second pixel value above the second threshold value to prevent storing the first pixel or the second pixel to the at least one memory; replace at least one of: the suppressed first pixel of the first image based on a third pixel value of a corresponding third pixel from a first additional image; or the suppressed second pixel of the second image based on a fourth pixel value of a corresponding fourth pixel from a second additional image; and output the first image or the second image, the first image or the second image including the third pixel or the fourth pixel.

As another example, a method is provided for processing image data. The method includes: obtaining a first image having a first exposure time and a second image having a second exposure time, wherein the second exposure time is greater than the first exposure time; determining at least one of: that a first pixel of the first image has a first pixel value below a first threshold value; or that a second pixel of the second image has a second pixel value above a second threshold value; suppressing at least one of the first pixel or the second pixel based on the determination that the first pixel has a first pixel value below the first threshold value or that the second pixel has a second pixel value above the second threshold value to prevent storing the first pixel or the second pixel; replacing at least one of: the suppressed first pixel of the first image based on a third pixel value of a corresponding third pixel from a first additional image; or the suppressed second pixel of the second image based on a fourth pixel value of a corresponding fourth pixel from a second additional image; and outputting the first image or the second image, the first image or the second image including the third pixel or the fourth pixel.

In another example, a non-transitory computer-readable medium is provided that has stored thereon instructions that, when executed by at least one processor, cause the at least one processor to: obtain a first image having a first exposure time and a second image having a second exposure time, wherein the second exposure time is greater than the first exposure time; determine at least one of: that a first pixel of the first image has a first pixel value below a first threshold value; or that a second pixel of the second image has a second pixel value above a second threshold value; suppress at least one of the first pixel or the second pixel based on the determination that the first pixel has a first pixel value below the first threshold value or that the second pixel has a second pixel value above the second threshold value to prevent storing the first pixel or the second pixel to a memory; replace at least one of: the suppressed first pixel of the first image based on a third pixel value of a corresponding third pixel from a first additional image; or the suppressed second pixel of the second image based on a fourth pixel value of a corresponding fourth pixel from a second additional image; and output the first image or the second image, the first image or the second image including the third pixel or the fourth pixel.

As another example, an apparatus is provided for processing image data. The apparatus includes: means for obtaining a first image having a first exposure time and a second image having a second exposure time, wherein the second exposure time is greater than the first exposure time; means for determining at least one of: that a first pixel of the first image has a first pixel value below a first threshold value; or that a second pixel of the second image has a second pixel value above a second threshold value; means for suppressing at least one of the first pixel or the second pixel based on the determination that the first pixel has a first pixel value below the first threshold value or that the second pixel has a second pixel value above the second threshold value to prevent storing the first pixel or the second pixel; means for replacing at least one of: the suppressed first pixel of the first image based on a third pixel value of a corresponding third pixel from a first additional image; or the suppressed second pixel of the second image based on a fourth pixel value of a corresponding fourth pixel from a second additional image; and means for outputting the first image or the second image, the first image or the second image including the third pixel or the fourth pixel.

In some aspects, one or more of the apparatuses or devices described herein is, can be part of, or can include a mobile device, a smart or connected device, a camera system, and/or an extended reality (XR) device (e.g., a virtual reality (VR) device, an augmented reality (AR) device, or a mixed reality (MR) device). In some examples, the apparatuses can include or be part of a mobile device (e.g., a mobile telephone or so-called "smart phone" or other mobile device), a wearable device, a personal computer, a laptop computer, a tablet computer, a server computer, a robotics device or system, or other device. In some aspects, the apparatus includes an image sensor (e.g., a camera) or multiple image sensors (e.g., multiple cameras) for capturing one or more images. In some aspects, the apparatus includes one or more displays for displaying one or more images, notifications, and/or other displayable data. In some aspects, the apparatus includes one or more speakers, one or more light-emitting devices, and/or one or more microphones. In some aspects, the apparatuses described above can include one or more sensors. In some cases, the one or more sensors can be used for determining a location of the apparatuses, a state of the apparatuses (e.g., a tracking state, an operating state, a temperature, a humidity level, and/or other state), and/or for other purposes.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

Illustrative examples of the present application are described in detail below with reference to the following figures:

FIG. 10 is a diagram illustrating an example implementation of the systems and techniques described herein for providing potential memory savings when suppressing and reconstructing pixel values, in accordance with aspects of the present disclosure:

FIG. 11 is a flow diagram illustrating an example of a process for processing image data, in accordance with aspects of the present disclosure;

DETAILED DESCRIPTION

Figure 1:
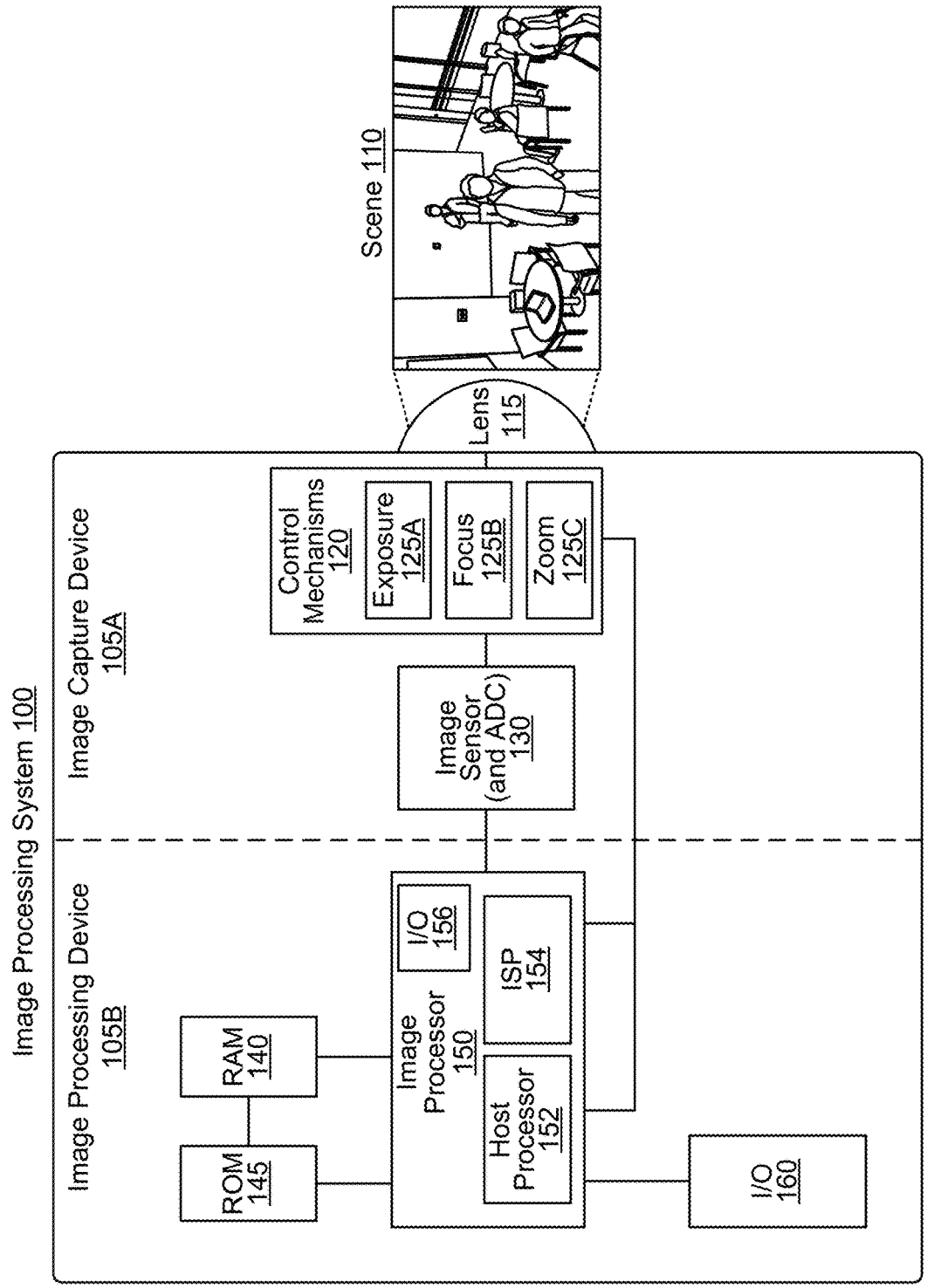
FIG. 1 is a block diagram illustrating an example architecture of an image processing system, in accordance with some examples of the present disclosure.

Certain aspects of this disclosure are provided below. Some of these aspects may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the exemplary aspects will provide those skilled in the art with an enabling description for implementing an exemplary aspect. It should be understood that various changes may be made in the function and arrangement of elements without departing from the spirit and scope of the application as set forth in the appended claims.

Electronic devices (e.g., mobile phones, wearable devices (e.g., smart watches, smart glasses, etc.), tablet computers, extended reality (XR) devices (e.g., virtual reality (VR) devices, augmented reality (AR) devices, mixed reality (MR) devices, and the like), connected devices, laptop computers, etc.) can implement cameras to capture images or video frames of a scene, a person(s), an animal(s), and/or any object(s). A camera can refer to a device that receives light and captures image frames, such as still images or video frames, using an image sensor. The terms "image," "image frame," and "frame" are used interchangeably herein. A camera system can include processors (e.g., an image signal processor (ISP), etc.) that can receive one or more images and process the one or more images. For example, a raw image captured by a camera sensor can be processed by an ISP to generate a final image. Processing by the ISP can be performed by filters or processing blocks applied to the captured image, such as denoising or noise filtering, edge enhancement, color balancing, contrast, intensity adjustment (such as darkening or lightening), tone adjustment, among others. Image processing blocks or modules may include lens/sensor noise correction, Bayer filters, de-mosaicing, color conversion, correction or enhancement/suppression of image attributes, denoising filters, sharpening filters, among others.

Electronic devices (e.g., mobile phones, wearable devices (e.g., smart watches, smart glasses, etc.), tablet computers, extended reality (XR) devices (e.g., virtual reality (VR) devices, augmented reality (AR) devices, mixed reality (MR) devices, and the like), connected devices, laptop computers, etc.) are increasingly equipped with camera hardware to capture image frames, such as still images and/or video frames, for consumption. For example, an electronic device can include a camera to allow the electronic device to capture a video or image of a scene, a person, an object, etc. A camera is a device that receives light and captures image frames (e.g., still images or video frames) using an image sensor. In some examples, a camera may include one or more processors, such as image signal processors (ISPs), that can process one or more image frames captured by an image sensor. For example, a raw image frame captured by an image sensor can be processed by an image signal processor (ISP) of a camera to generate a final image. In some cases, an electronic device implementing a camera can further process a captured image or video for certain effects (e.g., compression, image enhancement, image restoration, scaling, framerate conversion, etc.) and/or certain applications such as computer vision, extended reality (e.g., augmented reality, virtual reality, and the like), object detection, image recognition (e.g., face recognition, object recognition, scene recognition, etc.), feature extraction, authentication, and automation, among others.

Moreover, cameras can be configured with a variety of image capture and image processing settings to alter the appearance of an image. Some camera settings can be determined and applied before or while an image is captured, such as ISO, exposure time (also referred to as exposure duration), aperture size, f/stop, shutter speed, focus, and gain, among others. Some camera settings can be configured for post-processing of an image, such as alterations to a contrast, brightness, saturation, sharpness, levels, curves, and colors, among others. In some examples, a camera can be configured with certain settings to adjust the exposure of an image captured by the camera.

In photography, the exposure of an image captured by a camera refers to the amount of light per unit area that reaches a photographic film, or in modern cameras, an electronic image sensor. The exposure is based on certain camera settings such as, for example, shutter speed, exposure time, and/or lens aperture, as well as the luminance of the scene being photographed. Many cameras are equipped with an automatic exposure or "auto exposure" mode, where the exposure settings (e.g., shutter speed, exposure time, lens aperture, etc.) of the camera may be automatically adjusted to match, as closely as possible, the luminance of a scene or subject being photographed. In some cases, an automatic exposure control (AEC) engine can perform AEC to determine exposure settings for an image sensor.

In photography and videography, a technique referred to as high dynamic range (HDR) allows the dynamic range of image frames captured by a camera to be increased beyond the native capability of the camera. In this context, a dynamic range refers to the range of luminosity between the brightest area and the darkest area of the scene or image frame. For example, a high dynamic range means there is a lot of variation in light levels within a scene or an image frame. HDR can involve capturing multiple image frames of a scene with different exposures and combining captured image frames with the different exposures into a single image frame. The combination of image frames with different exposures can result in an image with a dynamic range higher than that of each individual image frame captured and combined to form the HDR image frame. For example, the electronic device can create a high dynamic range scene by fusing two or more exposure frames into a single frame. HDR is a feature often used by electronic devices, such as smartphones and mobile devices, for various purposes. For example, in some cases, a smartphone can use HDR to achieve a better image quality or an image quality similar to the image quality achieved by a digital single-lens reflex (DSLR) camera.

In some examples, the electronic device can create an HDR image using multiple image frames with different exposures. For example, the electronic device can create an HDR image using a short exposure (SE) image, a medium exposure (ME) image, and a long exposure (LE) image. As another example, the electronic device can create an HDR image using an SE image and an LE image. In some cases, the electronic device can write the different image frames from camera frontends to a memory device, such as a double data rate (DDR) synchronous dynamic random-access memory (SDRAM) or any other memory device. A processing engine can then retrieve the image frames to fuse the image frames into a single image. However, the different write and read operations used to create the HDR image can result in significant power and bandwidth consumption.

Generally, the over-exposed pixels of long exposure images and under-exposed pixels of short exposure images do not contribute to the final fused image (e.g., the HDR image) produced by the HDR algorithm. Nevertheless, the over-exposed pixels of long exposure images and under-exposed pixels of short exposure images are still written from the camera frontend to the memory device and read back from the memory device by the processing engine. Thus, the operations to read and write the over-exposed pixels of long exposure images and under-exposed pixels of short exposure images contribute to the power and bandwidth consumption of the electronic device even though such pixels do not contribute to the final fused image.

In some cases, images may have portions which includes pixels that have substantially the same value. For example, a portion of an image may include a clear blue sky and multiple pixels of this clear blue sky may be substantially similar. These small differences in pixel values between neighboring pixels may be difficult to recognize to the human eye. Additionally, images may be processed using various detection/recognition algorithms, and such small differences in neighboring pixels may not play a significant role in such tasks. In some cases, it may be useful to reduce an amount of image processing for such images.

Systems, apparatuses, methods (also referred to as processes), and computer-readable media (collectively referred to herein as "systems and techniques") are described herein for reducing power and bandwidth consumption when creating an HDR image. In some examples, the systems and techniques described herein can optimize the HDR algorithm and reduce the power and bandwidth consumption when creating an HDR image. In some cases, the systems and techniques described herein can reduce the power and bandwidth consumption when creating an HDR image by removing redundant pixel information and/or pixel information that does not contribute towards the final output when creating an HDR image.

In some cases, the systems and techniques herein can suppress pixels which do not contribute to the final fused image (e.g., HDR image or other image), such as the over-exposed pixels (or nearly over-exposed) of a long exposure image and/or the under-exposed pixels (or nearly under-exposed) of a short exposure image. The suppressed pixels may be removed or replaced by a value indicating the pixel is suppressed. During image compression, the indication the pixel is suppressed may be compressed more compactly than other pixel values as the other pixel values were replaced by a same indication the pixel is suppressed, the amount of information that is compressed can reduced and/or the compression ratio can be increased. In some cases, a pixel valid map may be generated based on whether the pixel is suppressed. In some cases, the suppressed pixels may not be stored to memory along with valid pixels in the exposure image. After retrieving the exposure image from the memory, the suppressed pixels may be restored based on correlated pixels in other exposure images. In some cases, the pixel values from the other exposure images may be adjusted based on an exposure ratio determined based on a difference exposure times as between the exposure image and the other exposure images.

Various aspects of the application will be described with respect to the figures.

FIG. 1 is a block diagram illustrating an example architecture of an image processing system 100. The image processing system 100 includes various components that are used to capture and process images, such as an image of a scene 110. The image processing system 100 can capture image frames (e.g., still images or video frames). In some cases, the lens 115 and image sensor 130 can be associated with an optical axis. In one illustrative example, the photosensitive area of the image sensor 130 (e.g., the photodiodes) and the lens 115 can both be centered on the optical axis.

In some examples, the lens 115 of the image processing system 100 faces a scene 110 and receives light from the scene 110. The lens 115 bends incoming light from the scene toward the image sensor 130. The light received by the lens 115 then passes through an aperture of the image processing system 100. In some cases, the aperture (e.g., the aperture size) is controlled by one or more control mechanisms 120. In other cases, the aperture can have a fixed size.

The one or more control mechanisms 120 can control exposure, focus, and/or zoom based on information from the image sensor 130 and/or information from the image processor 150. In some cases, the one or more control mechanisms 120 can include multiple mechanisms and components. For example, the control mechanisms 120 can include one or more exposure control mechanisms 125A, one or more focus control mechanisms 125B, and/or one or more zoom control mechanisms 125C. The one or more control mechanisms 120 may also include additional control mechanisms besides those illustrated in FIG. 1. For example, in some cases, the one or more control mechanisms 120 can include control mechanisms for controlling analog gain, flash, HDR, depth of field, and/or other image capture properties.

The focus control mechanism 125B of the control mechanisms 120 can obtain a focus setting. In some examples, focus control mechanism 125B store the focus setting in a memory register. Based on the focus setting, the focus control mechanism 125B can adjust the position of the lens 115 relative to the position of the image sensor 130. For example, based on the focus setting, the focus control mechanism 125B can move the lens 115 closer to the image sensor 130 or farther from the image sensor 130 by actuating a motor or servo (or other lens mechanism), thereby adjusting the focus. In some cases, additional lenses may be included in the image processing system 100. For example, the image processing system 100 can include one or more microlenses over each photodiode of the image sensor 130. The microlenses can each bend the light received from the lens 115 toward the corresponding photodiode before the light reaches the photodiode.

In some examples, the focus setting may be determined via contrast detection autofocus (CDAF), phase detection autofocus (PDAF), hybrid autofocus (HAF), or some combination thereof. The focus setting may be determined using the control mechanism 120, the image sensor 130, and/or the image processor 150. The focus setting may be referred to as an image capture setting and/or an image processing setting.

In some cases, the lens 115 can be fixed relative to the image sensor and the focus control mechanism 125B.

The exposure control mechanism 125A of the control mechanisms 120 can obtain an exposure setting. In some cases, the exposure control mechanism 125A stores the exposure setting in a memory register. Based on the exposure setting, the exposure control mechanism 125A can control a size of the aperture (e.g., aperture size or f/stop), a duration of time for which the aperture is open (e.g., exposure time or shutter speed), a duration of time for which the sensor collects light (e.g., exposure time or electronic shutter speed), a sensitivity of the image sensor 130 (e.g., ISO speed or film speed), analog gain applied by the image sensor 130, or any combination thereof. The exposure setting may be referred to as an image capture setting and/or an image processing setting.

The zoom control mechanism 125C of the control mechanisms 120 can obtain a zoom setting. In some examples, the zoom control mechanism 125C stores the zoom setting in a memory register. Based on the zoom setting, the zoom control mechanism 125C can control a focal length of an assembly of lens elements (lens assembly) that includes the lens 115 and one or more additional lenses. For example, the zoom control mechanism 125C can control the focal length of the lens assembly by actuating one or more motors or servos (or other lens mechanism) to move one or more of the lenses relative to one another. The zoom setting may be referred to as an image capture setting and/or an image processing setting. In some examples, the lens assembly may include a parfocal zoom lens or a varifocal zoom lens. In some examples, the lens assembly may include a focusing lens (which can be lens 115 in some cases) that receives the light from the scene 110 first, with the light then passing through an afocal zoom system between the focusing lens (e.g., lens 115) and the image sensor 130 before the light reaches the image sensor 130. The afocal zoom system may, in some cases, include two positive (e.g., converging, convex) lenses of equal or similar focal length (e.g., within a threshold difference of one another) with a negative (e.g., diverging, concave) lens between them. In some cases, the zoom control mechanism 125C moves one or more of the lenses in the afocal zoom system, such as the negative lens and one or both of the positive lenses. In some cases, zoom control mechanism 125C can control the zoom by capturing an image from an image sensor of a plurality of image sensors (e.g., including image sensor 130) with a zoom corresponding to the zoom setting. For example, the image processing system 100 can include a wide angle image sensor with a relatively low zoom and a telephoto image sensor with a greater zoom. In some cases, based on the selected zoom setting, the zoom control mechanism 125C can capture images from a corresponding sensor.

The image sensor 130 includes one or more arrays of photodiodes or other photosensitive elements. Each photodiode measures an amount of light that eventually corresponds to a particular pixel in the image produced by the image sensor 130. In some cases, different photodiodes may be covered by different filters. In some cases, different photodiodes can be covered in color filters, and may thus measure light matching the color of the filter covering the photodiode. Various color filter arrays can be used such as, for example and without limitation, a Bayer color filter array, a quad color filter array (QCFA), and/or any other color filter array.

In some cases, the image sensor 130 may alternately or additionally include opaque and/or reflective masks that block light from reaching certain photodiodes, or portions of certain photodiodes, at certain times and/or from certain angles. In some cases, opaque and/or reflective masks may be used for phase detection autofocus (PDAF). In some cases, the opaque and/or reflective masks may be used to block portions of the electromagnetic spectrum from reaching the photodiodes of the image sensor (e.g., an IR cut filter, a UV cut filter, a band-pass filter, low-pass filter, high-pass filter, or the like). The image sensor 130 may also include an analog gain amplifier to amplify the analog signals output by the photodiodes and/or an analog to digital converter (ADC) to convert the analog signals output of the photodiodes (and/or amplified by the analog gain amplifier) into digital signals. In some cases, certain components or functions discussed with respect to one or more of the control mechanisms 120 may be included instead or additionally in the image sensor 130. The image sensor 130 may be a charge-coupled device (CCD) sensor, an electron-multiplying CCD (EMCCD) sensor, an active-pixel sensor (APS), a complimentary metal-oxide semiconductor (CMOS), an N-type metal-oxide semiconductor (NMOS), a hybrid CCD/CMOS sensor (e.g., sCMOS), or some other combination thereof.

Figure 12:
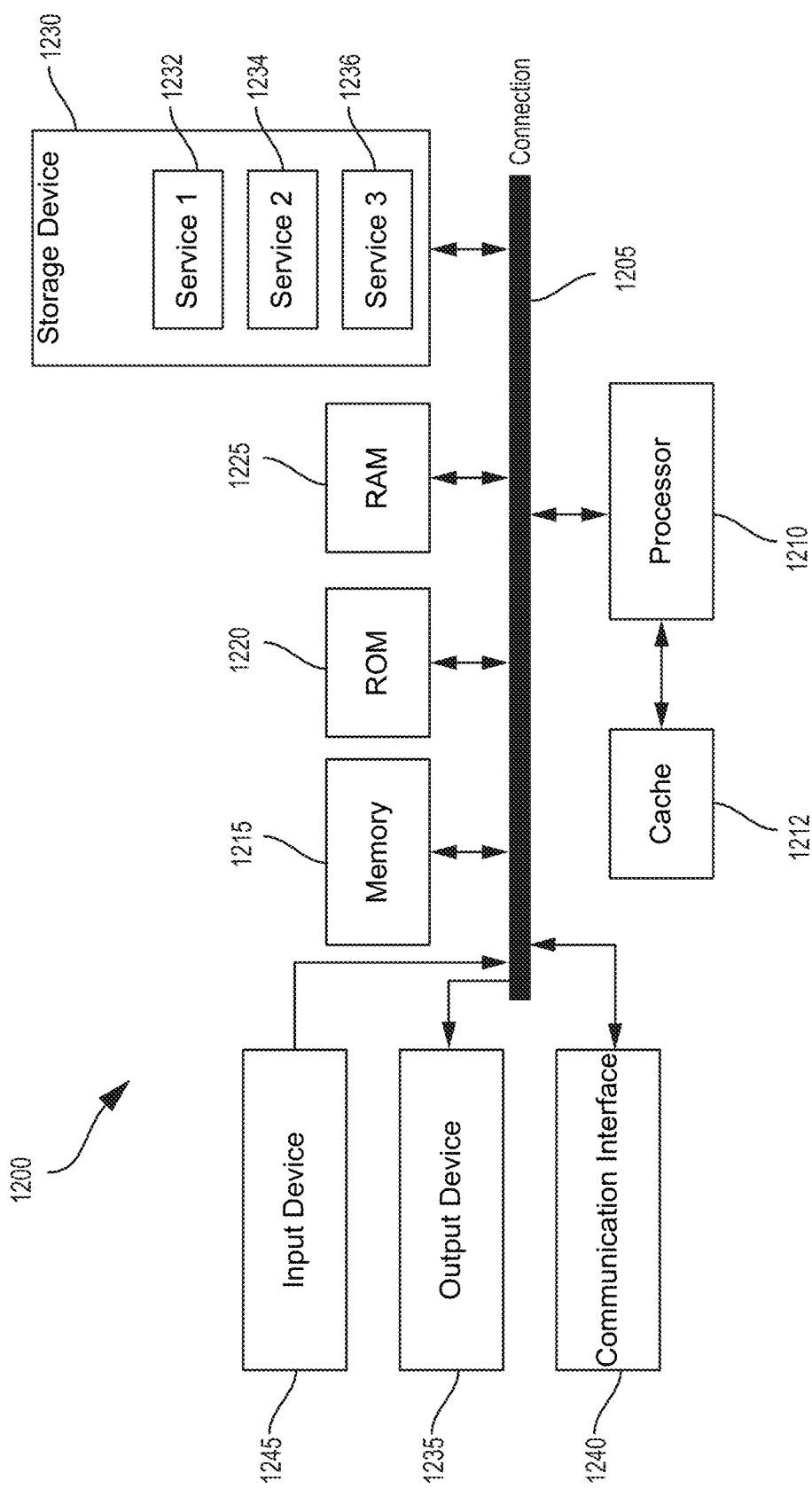
FIG. 12 is a diagram illustrating an example of a computing device architecture of an example computing device which can implement the various techniques described herein.

The image processor 150 may include one or more processors, such as one or more image signal processors (ISPs) (including ISP 154), one or more host processors (including host processor 152), and/or one or more of any other type of processor discussed with respect to the computing device architecture 1200 of FIG. 12. The host processor 152 can be a digital signal processor (DSP) and/or other type of processor. In some implementations, the image processor 150 is a single integrated circuit or chip (e.g., referred to as a system-on-chip or SoC) that includes the host processor 152 and the ISP 154. In some cases, the chip can also include one or more input/output ports (e.g., input/output (I/O) ports 156), central processing units (CPUs), graphics processing units (GPUs), broadband modems (e.g., 3G, 4G or LTE, 5G, etc.), memory, connectivity components (e.g., Bluetooth™, Global Positioning System (GPS), etc.), any combination thereof, and/or other components. The I/O ports 156 can include any suitable input/output ports or interface according to one or more protocol or specification, such as an Inter-Integrated Circuit 2 (I2C) interface, an Inter-Integrated Circuit 3 (I3C) interface, a Serial Peripheral Interface (SPI) interface, a serial General Purpose Input/Output (GPIO) interface, a Mobile Industry Processor Interface (MIPI) (such as a MIPI CSI-2 physical (PHY) layer port or interface, an Advanced High-performance Bus (AHB) bus, any combination thereof, and/or other input/output port. In one illustrative example, the host processor 152 can communicate with the image sensor 130 using an I2C port, and the ISP 154 can communicate with the image sensor 130 using an MIPI port.

The image processor 150 may perform a number of tasks, such as de-mosaicing, color space conversion, image frame downsampling, pixel interpolation, automatic exposure (AE) control, automatic gain control (AGC), CDAF, PDAF, automatic white balance, merging of image frames to form an HDR image, image recognition, object recognition, feature recognition, receipt of inputs, managing outputs, managing memory, or some combination thereof. The image processor 150 may store image frames and/or processed images in random access memory (RAM) 140, read-only memory (ROM) 145, a cache, a memory unit, another storage device, or some combination thereof.

Various input/output (I/O) devices 160 may be connected to the image processor 150. The I/O devices 160 can include a display screen, a keyboard, a keypad, a touchscreen, a trackpad, a touch-sensitive surface, a printer, any other output devices, any other input devices, or any combination thereof. In some cases, a caption may be input into the image processing device 105B through a physical keyboard or keypad of the I/O devices 160, or through a virtual key board or keypad of a touchscreen of the I/O devices 160. The I/O devices 160 may include one or more ports, jacks, or other connectors that enable a wired connection between the image processing system 100 and one or more peripheral devices, over which the image processing system 100 may receive data from the one or more peripheral device and/or transmit data to the one or more peripheral devices. The I/O devices 160 may include one or more wireless transceivers that enable a wireless connection between the image processing system 100 and one or more peripheral devices, over which the image processing system 100 may receive data from the one or more peripheral device and/or transmit data to the one or more peripheral devices. The peripheral devices may include any of the previously-discussed types of the I/O devices 160 and may themselves be considered I/O devices 160 once they are coupled to the ports, jacks, wireless transceivers, or other wired and/or wireless connectors.

In some cases, the image processing system 100 may be a single device. In some cases, the image processing system 100 may be two or more separate devices, including an image capture device 105A (e.g., a camera) and an image processing device 105B (e.g., a computing device coupled to the camera). In some implementations, the image capture device 105A and the image processing device 105B may be coupled together, for example via one or more wires, cables, or other electrical connectors, and/or wirelessly via one or more wireless transceivers. In some implementations, the image capture device 105A and the image processing device 105B may be disconnected from one another.

As shown in FIG. 1, a vertical dashed line divides the image processing system 100 of FIG. 1 into two portions that represent the image capture device 105A and the image processing device 105B, respectively. The image capture device 105A includes the lens 115, control mechanisms 120, and the image sensor 130. The image processing device 105B includes the image processor 150 (including the ISP 154 and the host processor 152), the RAM 140, the ROM 145, and the I/O devices 160. In some cases, certain components illustrated in the image capture device 105A, such as the ISP 154 and/or the host processor 152, may be included in the image capture device 105A. In some examples, the image processing system 100 can include one or more wireless transceivers for wireless communications, such as cellular network communications, 802.11 wi-fi communications, wireless local area network (WLAN) communications, or some combination thereof.

The image processing system 100 can be part of, or implemented by, a single computing device or multiple computing devices. In some examples, the image processing system 100 can be part of an electronic device (or devices) such as a camera system (e.g., a digital camera, an IP camera, a video camera, a security camera, etc.), a telephone system (e.g., a smartphone, a cellular telephone, a conferencing system, etc.), a laptop or notebook computer, a tablet computer, a set-top box, a smart television, a display device, a game console, an XR device (e.g., an HMD, smart glasses, etc.), an IoT (Internet-of-Things) device, a smart wearable device, a video streaming device, an Internet Protocol (IP) camera, or any other suitable electronic device(s).

The image capture device 105A and the image processing device 105B can be part of the same electronic device or different electronic devices. In some implementations, the image capture device 105A and the image processing device 105B can be different devices. For instance, the image capture device 105A can include a camera device and the image processing device 105B can include a computing device, such as a mobile device, a desktop computer, a smartphone, a smart television, a game console, or other computing device.

While the image processing system 100 is shown to include certain components, one of ordinary skill will appreciate that the image processing system 100 can include more components than those shown in FIG. 1. The components of the image processing system 100 can include software, hardware, or one or more combinations of software and hardware. For example, in some implementations, the components of the image processing system 100 can include and/or can be implemented using electronic circuits or other electronic hardware, which can include one or more programmable electronic circuits (e.g., microprocessors, GPUs, DSPs, CPUs, and/or other suitable electronic circuits), and/or can include and/or be implemented using computer software, firmware, or any combination thereof, to perform the various operations described herein. The software and/or firmware can include one or more instructions stored on a computer-readable storage medium and executable by one or more processors of the electronic device implementing the image processing system 100.

In some examples, the computing device architecture 1200 shown in FIG. 12 and further described below can include the image processing system 100, the image capture device 105A, the image processing device 105B, or a combination thereof.

In some examples, the image processing system 100 can create an HDR image using multiple image frames with different exposures. For example, the image processing system 100 can create an HDR image using a short exposure (SE) image, a medium exposure (ME) image, and a long exposure (LE) image. As another example, the image processing system 100 can create an HDR image using an SE image and an LE image. In some cases, the image processing system 100 can write the different image frames from one or more camera frontend engines to a memory device, such as a DDR memory device or any other memory device. A post-processing engine can then retrieve the image frames and fuse (e.g., merge, combine) them into a single image. As previously explained, the different write and read operations used to create the HDR image can result in significant power and bandwidth consumption.

Figure 2:
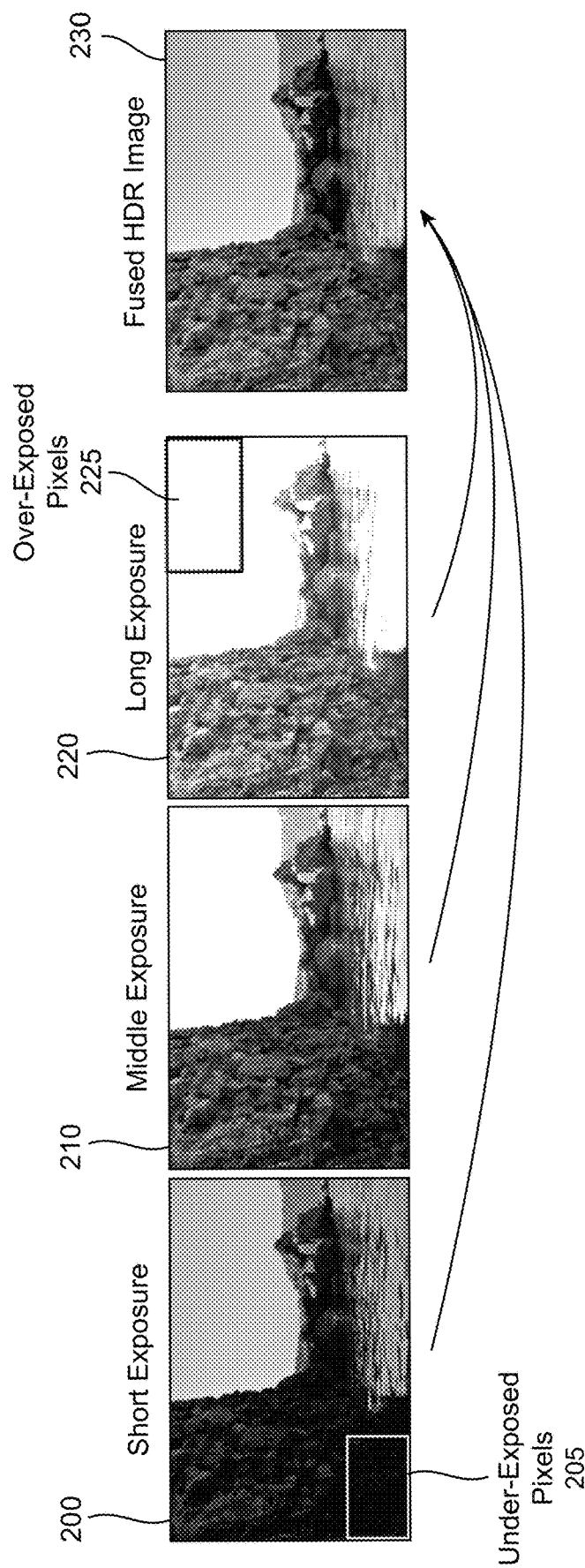
FIG. 2 illustrates multiple images with different exposures used to create a fused high dynamic range image, in accordance with some examples of the present disclosure.

As previously explained, when creating an HDR image, over-exposed pixels of a long exposure image and under-exposed pixels of a short exposure image generally do not contribute to the final HDR image produced by the image processing system 100. For example, FIG. 2 illustrates multiple images with different exposures used to create a fused HDR image (e.g., HDR image 230). In particular, FIG. 2 shows a short exposure image 200, a medium exposure image 210, a long exposure image 220, and an HDR image 230 generated by combining or fusing together the short exposure image 200, the medium exposure image 210, and the long exposure image 220. The short exposure image 200 includes under-exposed pixels 205, and the long exposure image 220 includes over-exposed pixels 225.

As shown in FIG. 2, the under-exposed pixels 205 in the short exposure image 200 and the over-exposed pixels 225 in the long exposure image 220 do not contribute to the pixels of the HDR image 230. In some cases, when creating the HDR image 230, the image processing system 100 writes the under-exposed pixels 205 in the short exposure image 200 and the over-exposed pixels 225 in the long exposure image 220 from a camera frontend engine(s) of the image processing system 100 to a memory device, reads them back (e.g., via an offline image processing engine) from the memory device, and processes the pixels of the three images (e.g., short exposure image 200, middle exposure image 210, and long exposure image 220) to create the HDR image 230. The operations to read, write, and process the under-exposed pixels 205 in the short exposure image 200 and the over-exposed pixels 225 in the long exposure image 220 contribute to the overall power and bandwidth consumption of the image processing system 100 when creating the HDR image 230, even though such pixels do not contribute to the HDR image 230.

Figure 3:
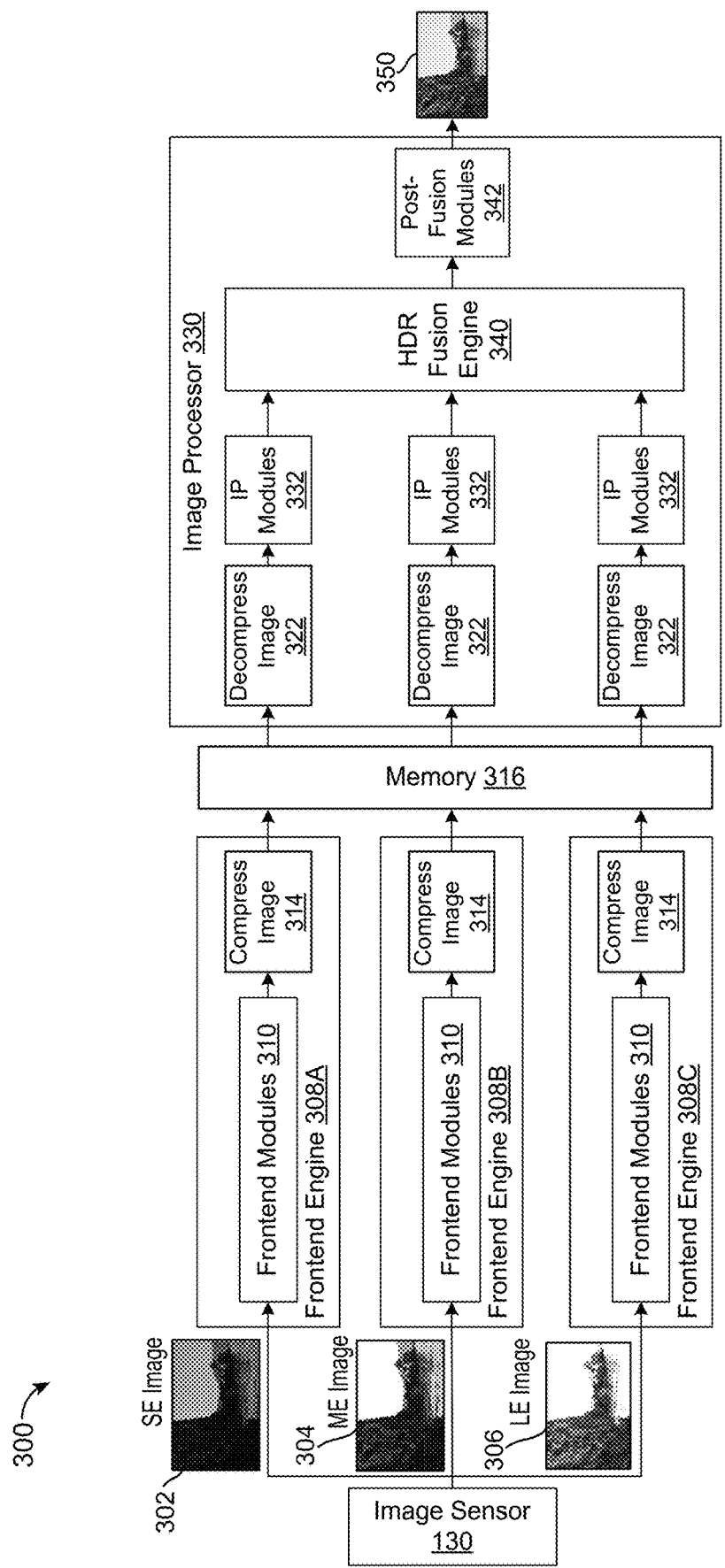
FIG. 3 is a block diagram illustrating an example system for generating an HDR image, in accordance with aspects of the present disclosure.

FIG. 3 is a block diagram illustrating an example system 300 for generating an HDR image 350, in accordance with aspects of the present disclosure. In this example, the system 300 generates an HDR image 350 using three images with different exposures. As shown, the image sensor 130 can capture a short-exposure (SE) image 302 of a scene, a medium-exposure (ME) image 304 of the scene, and a long-exposure (LE) image 306 of the scene. The SE image 302 can include an image with an exposure time below a threshold, the ME image 304 can include an image with an exposure time above a minimum threshold and below a maximum threshold (e.g., within a range of exposure times, within the minimum threshold and maximum threshold, and the like), and the LE image 306 can include an image with an exposure time above a threshold. Moreover, the exposure time of the SE image 302 is less than the exposure time of the ME image 304, and the exposure time of the ME image 304 is less than the exposure time of the LE image 306. In this illustrative example, the camera frontend engines includes a camera frontend engine 308A for processing the SE image 302, a camera frontend engine 308B for processing the ME image 304, and a camera frontend engine 308C for processing the LE image 306.

The image sensor 130 can provide the SE image 302, the ME image 304, and the LE image 306 to the camera frontend engines 308A, 308B, 308C (collectively 308) for processing. While shown as three separate frontend engines 308, it may be understood that system 300 may utilize one camera frontend engine or multiple camera frontend engines. For example, in some cases, the camera frontend engine 308 can include a single camera frontend engine and, in other cases, the camera frontend engines 308 can include multiple camera frontend modules 310.

The camera frontend engines 308 may include one or more frontend modules 310 which can apply one or more pre-processing operations to the captured SE image 302, ME image 304, and LE image 306. While one frontend module 310 is shown per frontend engine 308, it may be understood that the frontend engines may have any number of frontend modules 310. The pre-processing operations can include, for example and without limitation, a pixel brightness transformation (e.g., brightness correction, grey scale transformation, etc.), color space conversion, geometric transformation (e.g., rotation, scaling, translation, affine transformation, resizing, etc.), image filtering (e.g., image and/or edge smoothing and/or enhancement, denoising, image sharpening, etc.), image warping, image segmentation, image restoration, image enhancement, lens shading, color correction, black level adjustment, lens distortion correction, faulty pixel replacement, demosaicking, color balancing, compression, interpolation, motion compensation, any other image pre-processing operations, and/or a combination thereof.

Once pre-processed, the camera frontend engines 308 (or another component of the image processing system 100) can perform image compression 314 to compress the pre-processed SE image 302, ME image 304, and LE image 306. In some cases, the image compression 314 can include Bayer pattern compression. In some examples, the image compression 314 can include Huffman coding. In some cases, the image compression 314 can separately compresses each of the channels (e.g., red, green, and blue) of the SE image 302, the ME image 304 of the channels of the LE image 306. The compressed images may be written to memory 316. The memory 316 can include any memory device. For example, in some cases, the memory 316 can include the RAM 140 of the image processing system 100 shown in FIG. 1. In other cases, the memory 316 can include any of the memory device of computing device architecture 1200 shown in FIG. 12. In one illustrative example, the memory 316 can include a DDR memory device. In other illustrative examples, the memory 316 can include any other type of memory device.

An image processor 330 of the image processing system 100 can retrieve the compressed SE image 302, the compressed ME image 304, and the compressed LE image 306 from the memory 316 and perform image decompression 322 on the compressed SE image 302, the compressed ME image 304, and the compressed LE image 306. The image processor 330 can include one or more processors. Moreover, the image processor 330 can include any type of processors such as, for example, a CPU, a DSP, an ISP, an application-specific integrated circuit, etc. In one illustrative example, the image processor 330 can include an ISP, such as ISP 154 shown in FIG. 1.

The image processor 330 may perform one or more processing operations on the decompressed SE image 302, the decompressed ME image 304, and the decompressed LE image 306 via one or more image processing (IP) modules 332. While one IP module 332 is shown for processing each of the decompressed SE image 302, the decompressed ME image 304, and the decompressed LE image 306, it may be understood that any number of IP modules 332 may be used. The one or more processing operations can include, for example and without limitation, a filtering operation, a blending operation (e.g., blending pixel values) and/or interpolation operation, a pixel brightness transformation (e.g., brightness correction, grey scale transformation, etc.), a color space conversion, a geometric transformation (e.g., rotation, scaling, translation, affine transformation, resizing, etc.), a cropping operation, a white balancing operation, a denoising operation, an image sharpening operation, chroma sampling, image scaling, a lens correction operation, a segmentation operation, a filtering operation (e.g., filtering in terms of adjustments to the quality of the image in terms of contrast, noise, texture, resolution, etc.), an image warping operation, an image restoration operation, a lens shading operation, a lens distortion correction operation, a faulty pixel replacement operation, a demosaicking operation, a color balancing operation, a smoothing operation, an image enhancement operation, an operation for implementing an image effect or stylistic adjustment, a feature enhancement operation, an image scaling or resizing operation, a color correction operation, a black level adjustment operation, a linearization operation, a gamma correction operation, any other image post-processing operations, and/or a combination thereof.

In some cases, the image processor 330 can then perform HDR image fusion (e.g., by the HDR fusion engine 340) to fuse the decompressed SE image 302, decompressed ME image 304, and a decompressed LE image 306 into a fused HDR image. For example, the processor 330 can combine/merge the decompressed SE image 302, decompressed ME image 304, and a decompressed LE image 306 into a single, fused HDR image that has a higher dynamic range than either the SE image 302, the ME image 304, or the LE image 306.

After the HDR image fusion (e.g., by the HDR fusion engine 340), the image processor 330, in some cases, may perform post-fusion processing operations on the fused HDR image via post fusion modules 342. While one post fusion modules 342 is shown, it may be understood that any number of post fusion modules 342 may be used. The one or more post-fusion processing operations can include, for example and without limitation, a filtering operation, a blending operation (e.g., blending pixel values) and/or interpolation operation, a pixel brightness transformation (e.g., brightness correction, grey scale transformation, etc.), a color space conversion, a geometric transformation (e.g., rotation, scaling, translation, affine transformation, resizing, etc.), a cropping operation, a white balancing operation, a denoising operation, an image sharpening operation, chroma sampling, image scaling, a lens correction operation, a segmentation operation, a filtering operation (e.g., filtering in terms of adjustments to the quality of the image in terms of contrast, noise, texture, resolution, etc.), an image warping operation, an image restoration operation, a lens shading operation, a lens distortion correction operation, a faulty pixel replacement operation, a demosaicking operation, a color balancing operation, a smoothing operation, an image enhancement operation, an operation for implementing an image effect or stylistic adjustment, a feature enhancement operation, an image scaling or resizing operation, a color correction operation, a black level adjustment operation, a linearization operation, a gamma correction operation, any other image post-processing operations, and/or a combination thereof. The processor 330 may output the HDR image 350) based on the post-fusion processing operations performed on the fused HDR image.

Figure 4:
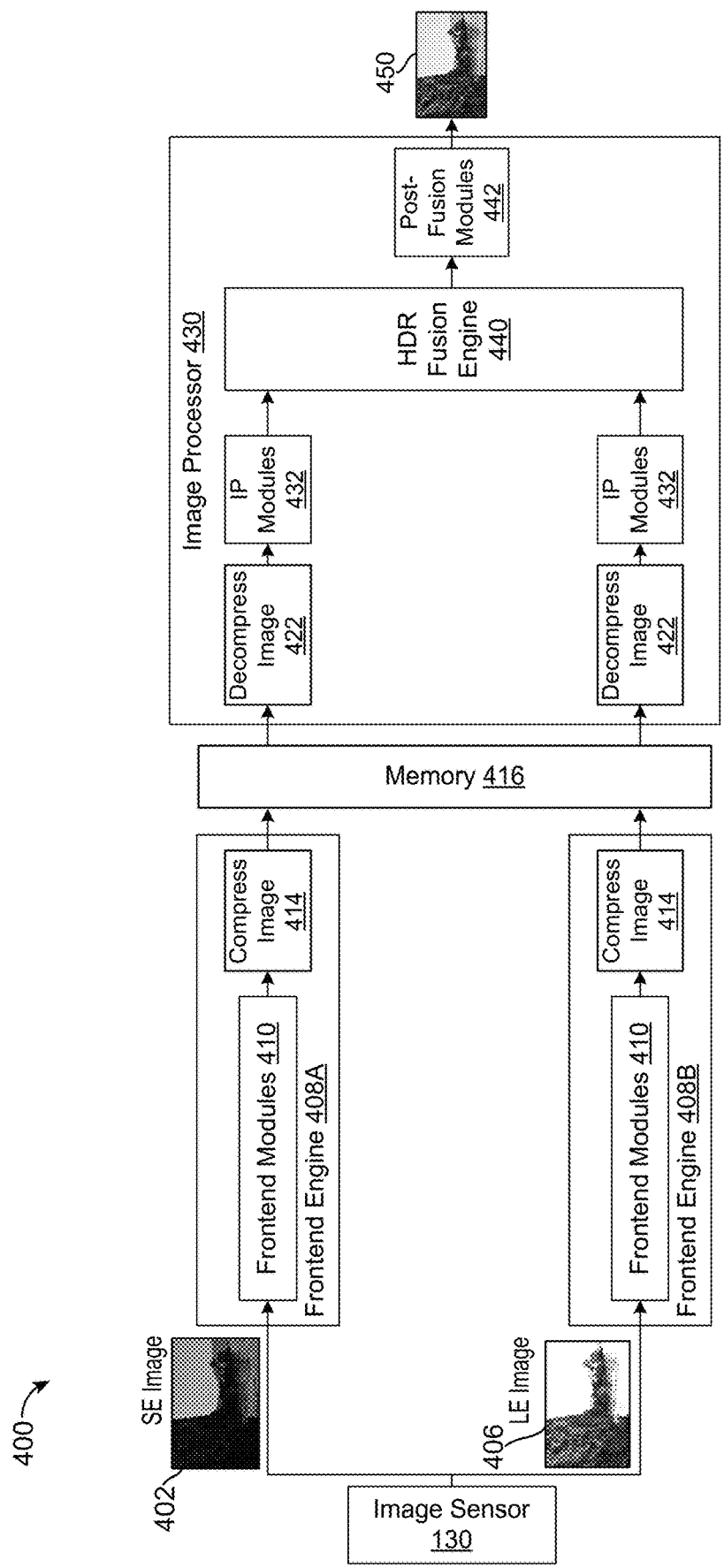
FIG. 4 is a block diagram illustrating another example system for generating an HDR image, in accordance with aspects of the present disclosure.

FIG. 4 is a block diagram illustrating another example system 400 for generating an HDR image 450, in accordance with aspects of the present disclosure. In this example, the system 400 generates an HDR image 450 using images with two different exposures. As shown, the image sensor 130 can capture a short-exposure (SE) image 402 of a scene and a long-exposure (LE) image 406 of the scene. In some cases, the system 400 for generating the HDR image 450 using two images is similar to the system 300 for generating the HDR image 350 using three images. In some cases, a difference in the system 400 for generating the HDR image 450) using two as compared to the system 300 for generating the HDR image 350) using three images is that the system 400 for generating the HDR image 450 does not use a medium exposure image. The SE image 402 can include an image with an exposure time below a threshold and the LE image 406 can include an image with an exposure time above a threshold.

The image sensor 130 can provide the SE image 402 and the LE image 406 to the camera frontend engines 408A, 408B (collectively 408) for processing. The camera frontend engines 408 may include one or more frontend modules 410 which can apply one or more pre-processing operations to the captured SE image 402 and LE image 406. Once pre-processed, the camera frontend engines 408 (or another component of the image processing system 100) can perform image compression 414 to compress the pre-processed SE image 402 and LE image 406. An image processor 430 of the image processing system 100 can retrieve the compressed SE image 402 and the compressed LE image 406 from the memory 416 and perform image decompression 422 on the compressed SE image 402 and the compressed LE image 406. The image processor 430 may perform one or more processing operations on the decompressed SE image 402 and the decompressed LE image 406 via one or more image processing (IP) modules 432. In some cases, the image processor 430 can then perform HDR image fusion (e.g., by the HDR fusion engine 440) to fuse the decompressed SE image 402, and a decompressed LE image 406 into a fused HDR image. After the HDR image fusion (e.g., by the HDR fusion engine 440), the image processor 330, in some cases, may perform post-fusion processing operations on the fused HDR image via post fusion modules 442. The processor 430 may output the HDR image 450 based on the post-fusion processing operations performed on the fused HDR image.

Figure 5:
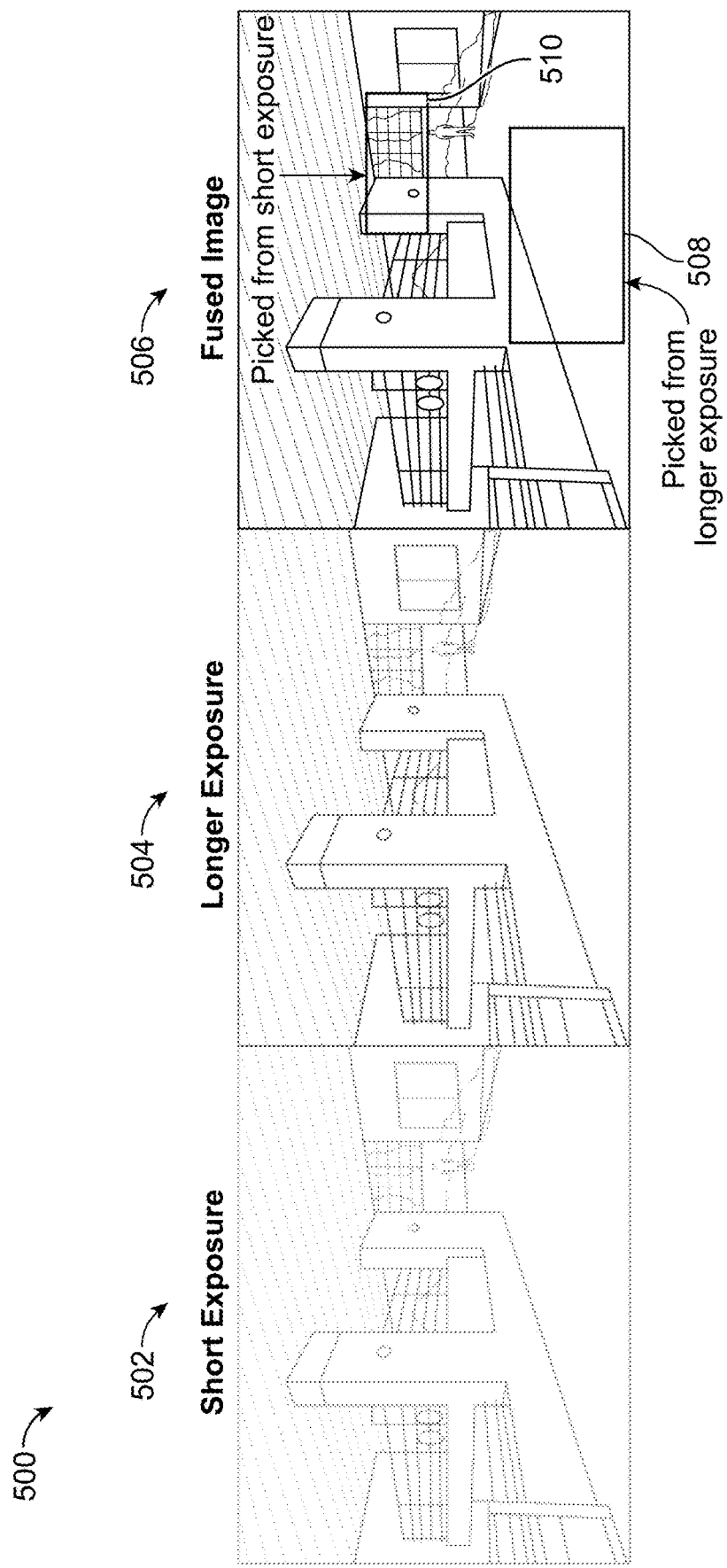
FIG. 5 is a diagram illustrating examples of techniques for generating a fused frame (also referred to as a combined frame or combined image) from short and long-exposure frames, in accordance with aspects of the present disclosure.

FIG. 5 is a diagram 500 illustrating techniques for generating a fused frame (also referred to as a combined frame or combined image) from short and long-exposure frames. As shown, a short-exposure frame 502 and a long-exposure frame 504 may be taken, which may be fused to provide a fused frame output 506 (e.g., an HDR frame output). Due to a bit depth of an image capture sensor, some pixels of a capture frame may be oversaturated, resulting in the image not showing some textures of a scene as shown in the short-exposure frame 502. Thus, to generate an HDR frame, both short and long-exposure frames may be captured, which may be fused (e.g., combined) to generate an HDR output frame. A fusion of short and long-exposure frames may be performed to generate a fused output frame that includes parts of the short-exposure frame and parts of the long-exposure frame. For example, region 508 of the fused frame output 506 may be from the long-exposure frame 504, while region 510 of the fused frame output 506 may be from the short-exposure frame 502. However, fusing short and long-exposure frames may result in irregularities due to global motion (e.g., motion of the image capture device). For example, from the time when the long-exposure frame is captured to the time when the short-exposure frame is captured, the image capture device or objects in a scene may have moved, causing irregularities if steps are not taken to align the short and long-exposure frames prior to fusing the frames together. This global motion issue may also arise due to a rolling shutter, as described in more detail herein.

Figure 6:
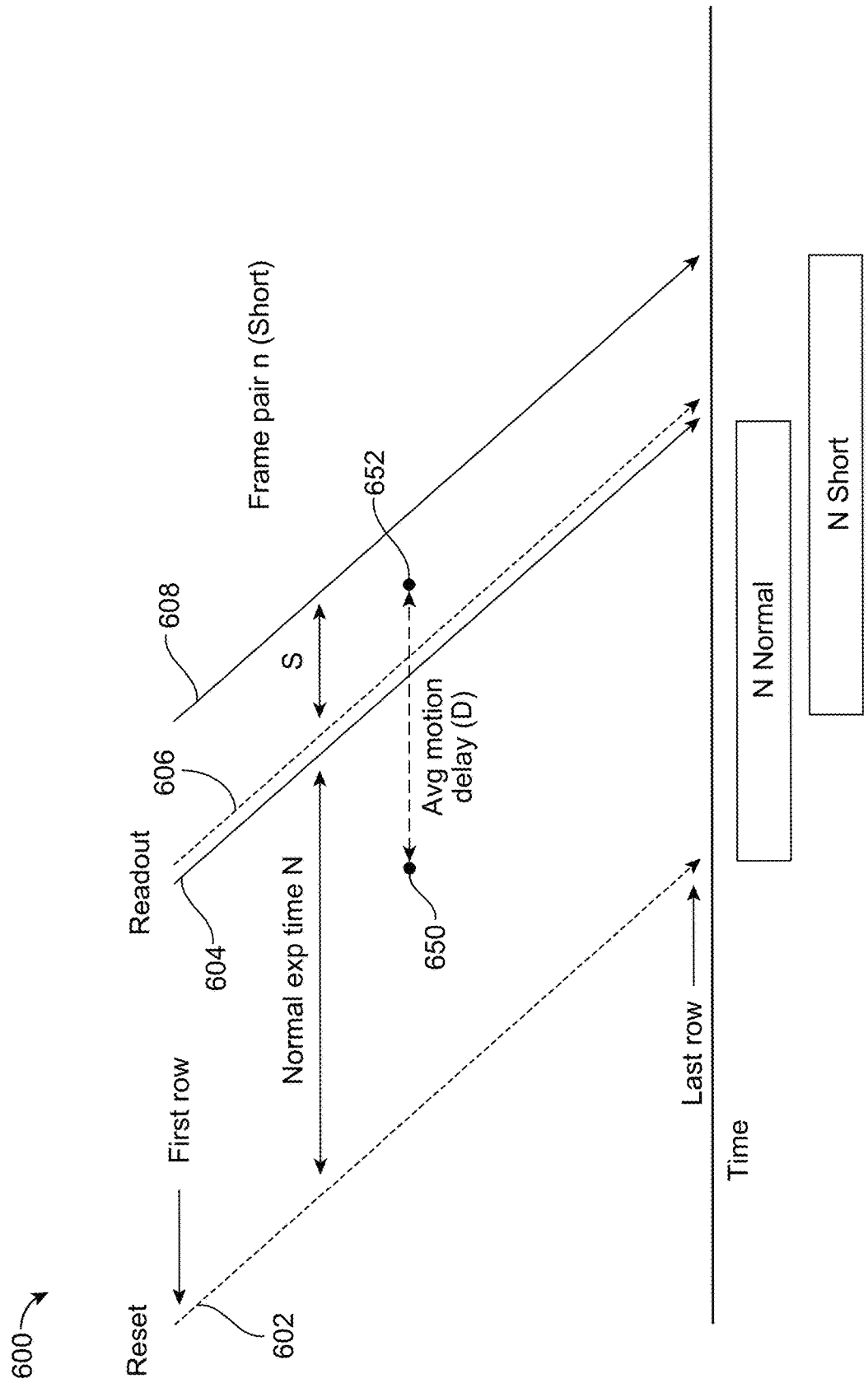
FIG. 6 is a diagram illustrating examples of long-exposure and short-exposure streams from an image sensor to an imaging front end for processing, in accordance with aspects of the present disclosure.

FIG. 6 is a diagram 600 illustrating long-exposure and short-exposure streams (e.g., MIPI stream) from an image sensor (e.g., image sensor 130 of FIG. 1) to an imaging front end (e.g., of an ISP, such as the ISP 154 of FIG. 1) for processing. Line 602 represents the start of long-exposure sensing (also referred to herein as normal exposure sensing), and line 604 represents the end of the long-exposure sensing. The long-exposure sensing starts from the first row of a sensor (e.g., image sensor 130 of FIG. 1) to the last row of the sensor, as shown. For each row (e.g., row of photodiodes), once the long-exposure sensing has completed, short-exposure sensing begins while the long-exposure sensing continues to the next row. For example, line 606 represents the beginning of the short-exposure sensing, and line 608 represents the end of the short-exposure sensing, starting from the first row to the last row of the image sensor. The long-exposure sensing (e.g., having a duration labeled "N Normal" in FIG. 6) may begin prior to the short-exposure sensing (e.g., having a duration labeled "N short" in FIG. 6).

Once the long-exposure sensing for a particular row is completed, a short delay (e.g., associated with the gap between lines 604, 606) occurs before the short-exposure sensing begins. Once the short-exposure sensing has finished for a particular row, the information for the row is read out from the image sensor for processing. Due to the gap from the long-exposure sensing to the short-exposure sensing (e.g., shown as an average motion delay (D) in FIG. 6), an opportunity exists for a user who is holding the camera to move and/or for objects in a scene being captured to move, resulting in a misalignment of features in the short and long-exposure frames (e.g., features that are common or the same in the short and long-exposure frames). For example, a motion delay (D) may exist from time 650 (e.g., time when half of the long-exposure data is captured) and time 652 (e.g., the time when half of the short-exposure data is captured). The motion delay (D) may be estimated as being the average motion delay associated with different long and short frame capture events (e.g., different HDR frame captures).

Because the sensing occurs one row at a time (e.g., starting from the first row to the last row), a rolling shutter global motion also occurs. The camera or objects in scene may move from when the data for a first row of sensors are captured to when the data for a last row of sensors are captured. In some cases, local and global motion may be corrected via motion compensation techniques. In some cases, local motion (e.g., objects moving between captures) may be corrected, for example, using optical flow compensation. In some cases, global motion (e.g., camera movement between captures) may be corrected, for example, by aligning multiple images based on motion sensor data from a motion sensor. Examples of motion sensors include gyroscopes, accelerometers, and the like. The motion data from the motion sensor may be used to define an angle between multiple exposure images and images of the multiple exposure images may be rotated based on the angle to align the images.

In accordance with aspects of the present disclosure, a process for creating an HDR image may be optimized to help reduce power and/or bandwidth consumption by removing redundant pixel information and/or pixel information that does not contribute towards the final output. As an example, the process for creating the HDR image may suppress (e.g., remove) pixel values that do not contribute to the output HDR image, such as the under-exposed pixels in the short exposure image 502 and/or the over-exposed pixels in the long exposure image 504, and thus reduce the amount of information processed (e.g., compressed/decompressed, written to and read from memory, fused to create the HDR image, etc.). In some cases, there may be a correlation between pixels across multiple exposure images, after motion and exposure compensation, and this correlation may be used to help reduce an amount of image data that may need to be written to and read from memory when processing the multiple exposure images.

Figure 7:
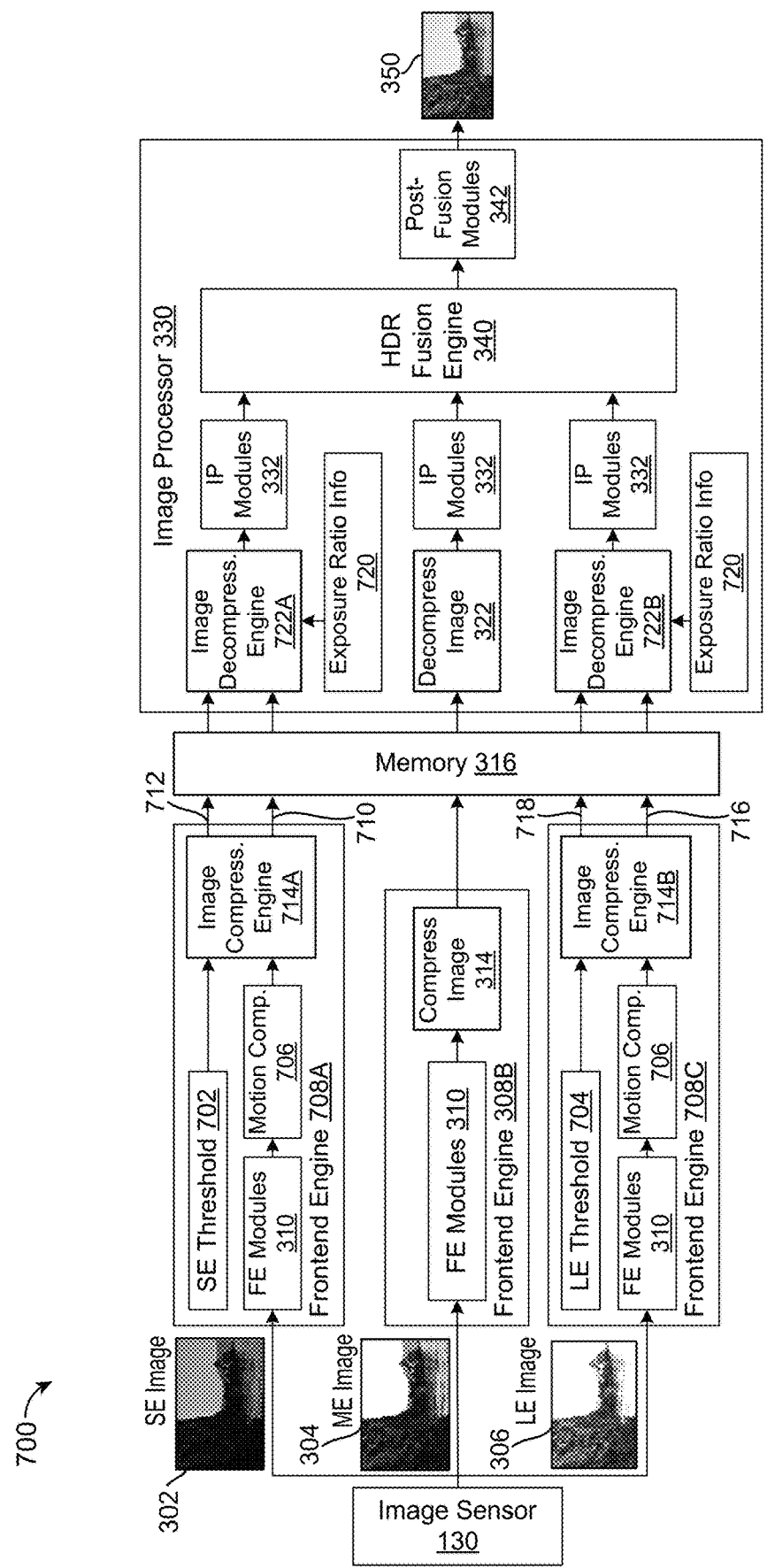
FIG. 7 is a block diagram illustrating an example system suppressing and reconstructing pixel values to generate an HDR image, in accordance with aspects of the present disclosure.

FIG. 7 is a block diagram illustrating an example system 700 for suppressing and reconstructing pixel values to generate an HDR image 350, in accordance with aspects of the present disclosure. System 700, in this example, is similar to system 300 and components of system 700 which are substantially similar to those discussed in system 300 are numbered with the same number as in system 300. Similar to system 300, the system 700 also generates an HDR image 350 using three images with different exposures. As shown, system 700 includes a frontend engine 708A for processing an SE image 302, a frontend engine 308B for processing an ME image 304, and a frontend engine 708C for processing a LE image 306. In system 700, frontend engine 708A and frontend engine 708C may be configured to suppress certain pixels, such as under-exposed or over-exposed pixels based on threshold values, such as SE threshold value 702 and LE threshold value 704.

For example, image sensor 130 can capture one or more portions of the SE image 302 of a scene and input the captured portions of the SE image 302 to FE modules 310 of frontend engine 308A for processing. In some cases, motion compensation 706 may also be applied to the captured portions of the SE image 302. In some cases, the motion compensation 706 may be similar to motion compensation as discussed above with respect to FIG. 6. In some cases, the motion compensation 706 may be applied by one or more FE modules 310. The image data from the captured portions of the SE image 302 may then be passed into an image compression engine 714A along with an SE threshold value 702. In some cases, the image compression engine 714A may compare pixel values from the image data from the captured portions of the SE image 302 to the SE threshold value 702 to determine whether to suppress (e.g., remove, prevent storage of) the pixel values that are expected to have little or no contribution to the fused HDR image. For example, the pixel values which exceed the SE threshold value 702 may be under-exposed or nearly under-exposed (e.g., too dark) and the corresponding pixel value for the final HDR image may be based completely (or nearly completely) on a pixel value from a longer exposure image (e.g., the ME or LE exposure images). In some cases, the SE threshold value 702 may be determined, at least in part, based on lighting conditions in the environment and/or camera settings. The remaining pixel values (e.g., pixel values which were not suppressed) may be compressed using any known image compression technique and output SE compressed pixel values 710 for storage in memory 316. Additionally, the image compression engine 714A may also output an SE pixel valid map 712 for storage in memory 316. The SE pixel valid map may indicate which pixel values were suppressed and which pixel values were not suppressed in the corresponding portion of the SE image 302. In some cases, the SE pixel valid map may be a one-bit (e.g., valid/invalid) bitmap representation of the pixels in the captured portion of the SE image 302. In some cases, the stored SE compressed pixel values and the stored SE pixel valid map may be built up as portions of the SE image 302 are processed by the frontend engine 708A.

Similarly, the image sensor 130 can capture one or more portions of the LE image 306 of the scene and input the captured portions of the LE image 306 to FE modules 310 of frontend engine 308C for processing. In some cases, motion compensation 706 may also be applied to the captured portions of the LE image 302. In some cases, the motion compensation 706 may be similar to motion compensation as discussed above with respect to FIG. 6. In some cases, the motion compensation 706 may be applied by one or more FE modules 310. In some cases, motion compensation 706 may be applied to align other images to a common image, such as the ME image when 3 images are fused, or either one of the SE or LE image when 2 images are fused, or motion compensation 706 may be applied to all of the images to be fused. The image data from the captured portions of the LE image 306 may then be passed into an image compression engine 714B along with an LE threshold value 706. In some cases, the image compression engine 714B may compare pixel values from the image data from the captured portions of the LE image 306 to the LE threshold value 702 to determine whether to suppress (e.g., remove) the pixel values that are expected to have little or no contribution to the fused HDR image. For the LE image 306, the pixel values which exceed the LE threshold value 706 may be over-exposed or nearly over-exposed (e.g., too light or blown out) and the corresponding pixel value for the final HDR image may be based completely (or nearly completely) on a pixel value from a shorter exposure image (e.g., the ME or SE exposure images). As with the SE threshold value 702, the LE threshold value 706 may be determined, at least in part, based on lighting conditions in the environment and/or camera settings. The remaining pixel values (e.g., pixel values which were not suppressed) may be compressed using any known image compression technique and output LE compressed pixel values 716 for storage in memory 316. Additionally, the image compression engine 714B may also output an LE pixel valid map 718 for storage in memory 316. The LE pixel valid map may indicate which pixel values were suppressed and which pixel values were not suppressed in the corresponding portion of the LE image 306. In some cases, the LE pixel valid map may be a two-bit bitmap representation of the pixels in the captured portion of the LE image 306. In some cases, the stored LE compressed pixel values and the stored LE pixel valid map may be built up as portions of the LE image 306 are processed by the frontend engine 708C.

In some cases, the image sensor 130 can capture one or more portions of the ME image 304 of the scene and input the captured portions of the ME image 304 to FE modules 310 of frontend engine 308B for processing. In some cases, the captured portions of the ME image 304 may be processed, compressed 314, and stored in memory 316 in a manner similar to that discussed in conjunction with FIG. 3. For example, the captured portions of the ME image 304 may be expected to rarely be under-exposed or over-exposed and may be used to generate the HDR image for nearly all images. In other cases, pixels of the captured portions of the ME image 304 may be suppressed based on both the SE threshold value 702 and the LE threshold value 706 and remaining pixel values may be stored in memory 316 along with a corresponding SE pixel valid map and LE pixel valid map.

The stored SE compressed pixel values and the corresponding stored SE pixel valid map may be loaded from memory 316 by an image decompression engine 722A of the image processor 330. In some cases, the image decompression engine 722A may reconstruct suppressed pixel values based on the SE pixel valid map, corresponding (e.g., correlated) pixel values from other exposure images, and exposure ratio information 720. For example, the based on the SE pixel valid map, pixel values corresponding to a pixel suppressed from the stored SE compressed pixel values may be retrieved from a decompressed ME image, LE image, and/or memory 316. In some cases, the ME image and/or LE image may be retrieved from memory 316. This retrieved pixel value may be adjusted based on a difference in exposure time between the exposure from where the retrieved pixel value came from and the SE image 302 exposure time. In some cases, this difference in exposure time may be expressed as an exposure ratio. For example, an ME exposure may have an exposure time twice as long as an SE exposure, and an LE exposure may have an exposure time three times as long as the SE exposure. In some cases, this exposure ratio may be determined prior to or at the time the SE image 302, ME image 304, and LE image 306 were taken and the exposure ratio may be associated with the images. In some cases, a suppressed pixel value may be reconstructed based on a product of a corresponding retrieved pixel value and the exposure ratio. For example, a suppressed SE pixel value may be reconstructed from a corresponding ME exposure pixel value with a 2× exposure ratio by multiplying the ME exposure pixel value by ½. After the suppressed SE pixel values are reconstructed, the SE image 302 may be decompressed and a resulting decompressed SE image 302 may be input to one or more image processing (IP) modules 332.

In some cases, rather than reconstructing suppressed pixel values, the image decompression engine 722A may, based on the SE pixel valid map, insert an indication to the HDR fusion engine 340 to use pixel values from other exposure images, such as the ME image 304 and/or the LE image 306. In some cases, this indication may be a minimum or maximum pixel value, or other value designated as the indication to the HDR fusion engine 340. In some cases, the image decompression engine 722A and the IP modules 332 may be configured to also ignore suppressed pixels and pass on the SE pixel valid map to the HDR fusion engine 340. Based on the SE pixel valid map, the HDR fusion engine 340 may use pixel values from other exposure images.

In some cases, after the one or more processing operations of IP modules 332 are performed, a post processed SE image 302 may be input to HDR fusion engine 340. As pixel values wherein were suppressed in the image compression engine 714 were restored by the image decompression engine 722A, processing by the IP modules 332 and HDR fusion, such as by the HDR fusion engine 340, and post fusion module 342 operations may proceed substantially the same as described with respect to FIG. 3. For example, the HDR fusion engine 340 may combine/merge the decompressed, processed SE image 302, the decompressed, processed ME image 304, and the decompressed, processed LE image 306 into a single, fused HDR image. The fused HDR image may be input to one or more post fusion modules 342 for post-fusion processing operations. In some cases, after post processing operations, the image processor 330 may output the HDR image 350.

Similarly, the stored LE compressed pixel values and corresponding stored LE pixel valid map may be loaded from memory 316 by an image decompression engine 722B of the image processor 330. In some cases, the image decompression engine 722B may reconstruct suppressed pixel values based on the LE pixel valid map, corresponding (e.g., correlated) pixel values from other exposure images, and exposure ratio information 720. For example, the based on the LE pixel valid map, pixel values corresponding to a pixel suppressed from the stored LE compressed pixel values may be retrieved from a decompressed ME image, SE image, and/or memory 316 and the retrieved pixel value may be adjusted based on a difference in exposure time between the exposure from where the retrieved pixel value came from and the LE image 306 exposure time. For example, a suppressed LE pixel value may be reconstructed from a corresponding ME exposure pixel value with a 3:2 exposure ratio by multiplying the ME exposure pixel value by 1.5. After the suppressed LE pixel values are reconstructed, the LE image 306 may be decompressed and a resulting decompressed LE image 306 may be input to one or more IP modules 332.

In some cases, rather than reconstructing suppressed pixel values, the image decompression engine 722B may, based on the LE pixel valid map, insert an indication to the HDR fusion engine 340 to use pixel values from other exposure images, such as the ME image 304 and/or the LE image 306. In some cases, this indication may be a minimum or maximum pixel value, or other value designated as the indication to the HDR fusion engine 340. In some cases, the image decompression engine 722B and the IP modules 332 may be configured to also ignore suppressed pixels and pass on the LE pixel valid map to the HDR fusion engine 340. Based on the LE pixel valid map, the HDR fusion engine 340 may use pixel values from other exposure images.

In some cases, after the one or more processing operations of IP modules 332 are performed, a post processed LE image 306 may be input to HDR fusion engine 340. In some cases, the HDR fusion engine 340 may output a fused HDR image that may be input to one or more post fusion modules 342 for post-fusion processing operations. In some cases, after post processing operations, the image processor 330 may output the HDR image 350.

In some cases, the compressed ME image 304 may be loaded from memory 316 and image decompression 322 performed on the compressed ME image 304. In some cases, image decompression 322 of system 700 may be preformed in a manner substantially similar to image decompression 322 of system 300. In other cases, image decompression 322 of system 700 may be performed in a manner similar to that performed by both image decompression engine 722A and image decompression engine 722B. A resulting decompressed ME image 304 may be input to one or more IP modules 332. In some cases, after the one or more processing operations of IP modules 332 are performed, a post processed ME image 304 may be input to HDR fusion engine 340. In some cases, the HDR fusion engine 340 may output a fused HDR image that may be input to one or more post fusion modules 342 for post-fusion processing operations. In some cases, after post processing operations, the image processor 330 may output the HDR image 350.

Figure 8:
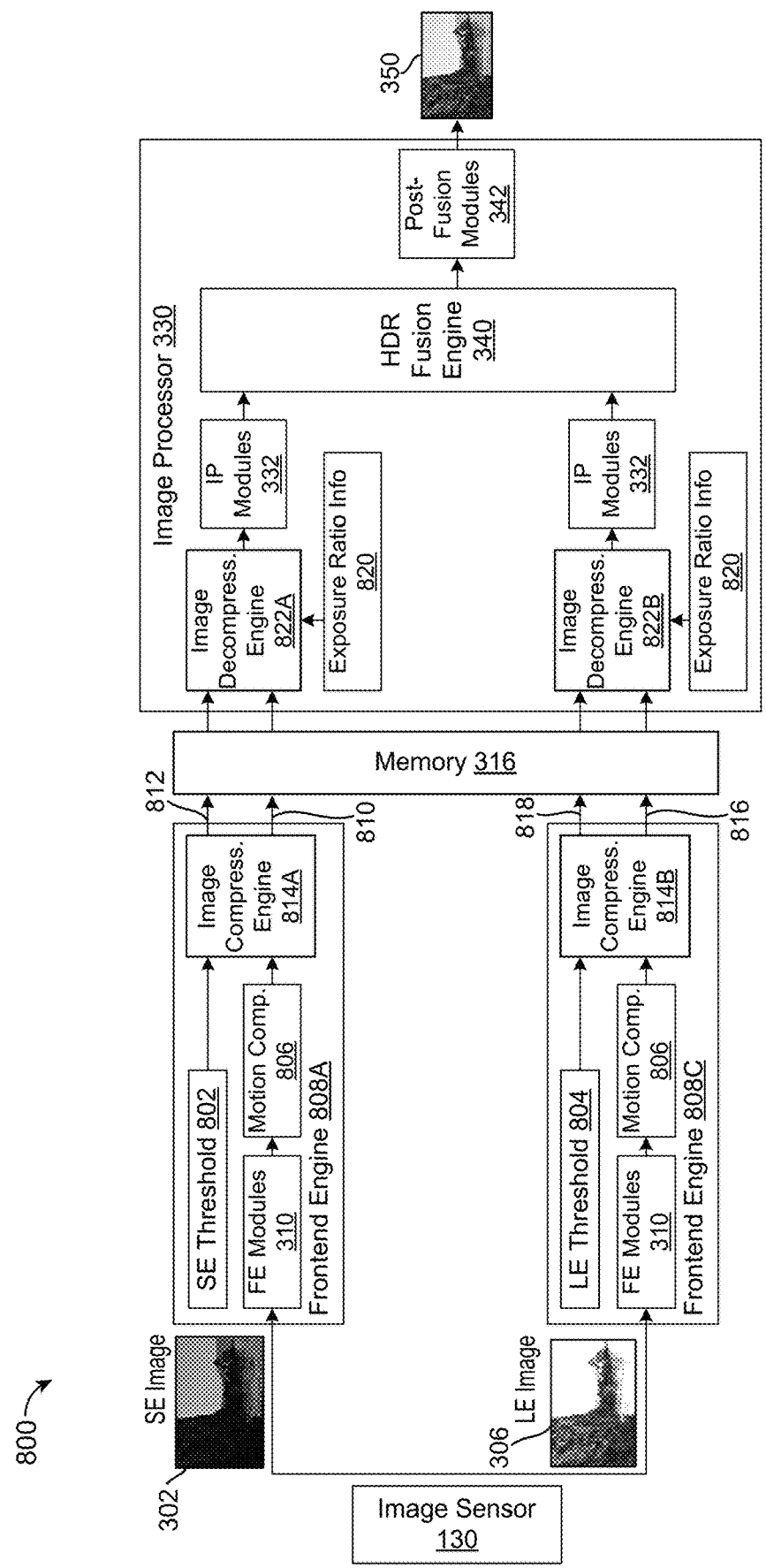
FIG. 8 is a block diagram illustrating an example system for suppressing and reconstructing pixel values to generate an HDR image, in accordance with aspects of the present disclosure.

FIG. 8 is a block diagram illustrating an example system 800 for suppressing and reconstructing pixel values to generate an HDR image, in accordance with aspects of the present disclosure. System 800, in this example, is similar to system 400 and components of system 800 which are substantially similar to those discussed in system 400 are numbered with the same number as in system 400. In this example, the system 800 generates an HDR image 450 using images with two different exposures. As shown, the image sensor 130 can capture an SE image 402 of a scene and an LE image 406 of the scene. In some cases, the system 800 for generating the HDR image 450 using two images is similar to the system 700 for generating the HDR image 350 using three images. In some cases, a difference in the system 800 for generating the HDR image 450 using two images as compared to the system 700 for generating the HDR image 350 using three images is that the system 800 for generating the HDR image 450 does not use an ME image. The SE image 402 can include an image with an exposure time below a threshold and the LE image 406 can include an image with an exposure time above a threshold. A difference in exposure time between the SE image 402 and LE image 406 may also be expressed as an exposure ratio.

In system 800 image sensor 130 can capture one or more portions of the SE image 302 of a scene and input the captured portions of the SE image 302 to FE modules 310 of frontend engine 808A for processing. In some cases, motion compensation 806 may also be applied to the captured portions of the SE image 302. In some cases, the motion compensation 806 may be similar to motion compensation as discussed above with respect to FIG. 6. In some cases, the motion compensation 706 may be applied by one or more FE modules 310. The image data from the captured portions of the SE image 302 may then be passed into an image compression engine 814A along with an SE threshold value 802. In some cases, the image compression engine 814A may compare pixel values from the image data from the captured portions of the SE image 302 to the SE threshold value 802 to determine whether to suppress (e.g., remove) the pixel values that are expected to have little or no contribution to the fused HDR image. For example, the pixel values which exceed the SE threshold value 802 may be under-exposed or nearly under-exposed (e.g., too dark) and the corresponding pixel value for the final HDR image may be based completely (or nearly completely) on a pixel value from a longer exposure image (e.g., LE exposure images). In some cases, the SE threshold value 802 may be determined, at least in part, based on lighting conditions in the environment and/or camera settings. The remaining pixel values (e.g., pixel values which were not suppressed) may be compressed using any known image compression technique and output SE compressed pixel values 810 for storage in memory 316. Additionally, the image compression engine 814A may also output an SE pixel valid map 812 for storage in memory 316. The SE pixel valid map may indicate which pixel values were suppressed and which pixel values were not suppressed in the corresponding portion of the SE image 302. In some cases, the SE pixel valid map may be a two-bit bitmap representation of the pixels in the captured portion of the SE image 302. In some cases, the stored SE compressed pixel values and the stored SE pixel valid map may be built up as portions of the SE image 302 are processed by the frontend engine 808A.

Similarly, the image sensor 130 can capture one or more portions of the LE image 306 of the scene and input the captured portions of the LE image 306 to FE modules 310 of frontend engine 308C for processing. In some cases, motion compensation 806 may also be applied to the captured portions of the LE image 302. In some cases, the motion compensation 806 may be similar to motion compensation as discussed above with respect to FIG. 6. In some cases, the motion compensation 706 may be applied by one or more FE modules 310. In some cases, motion compensation 706 may be applied to either, but not both, of the SE image 302 or the LE image 306. In other cases, motion compensation 706 may be applied to both the SE image 302 and the LE image 306. The image data from the captured portions of the LE image 306 may then be passed into an image compression engine 814B along with an LE threshold value 806. In some cases, the image compression engine 814B may compare pixel values from the image data from the captured portions of the LE image 306 to the LE threshold value 802 to determine whether to suppress (e.g., remove) the pixel values that are expected to have little or no contribution to the fused HDR image. For the LE image 306, the pixel values which exceed the LE threshold value 806 may be over-exposed or nearly over-exposed (e.g., too light or blown out) and the corresponding pixel value for the final HDR image may be based completely (or nearly completely) on a pixel value from a shorter exposure image (e.g., the SE exposure images). As with the SE threshold value 702, the LE threshold value 806 may be determined, at least in part, based on lighting conditions in the environment and/or camera settings. The remaining pixel values (e.g., pixel values which were not suppressed) may be compressed using any known image compression technique and output LE compressed pixel values 816 for storage in memory 316. Additionally, the image compression engine 814B may also output an LE pixel valid map 818 for storage in memory 316. The LE pixel valid map may indicate which pixel values were suppressed and which pixel values were not suppressed in the corresponding portion of the LE image 306. In some cases, the LE pixel valid map may be a two-bit bitmap representation of the pixels in the captured portion of the LE image 306. In some cases, the stored LE compressed pixel values and the stored LE pixel valid map may be built up as portions of the LE image 306 are processed by the frontend engine 808C.

In some cases, the stored SE compressed pixel values and the corresponding stored SE pixel valid map may be loaded from memory 316 by an image decompression engine 822A of the image processor 330. In some cases, the image decompression engine 822A may reconstruct suppressed pixel values based on the SE pixel valid map, corresponding (e.g., correlated) pixel values from other exposure images, and exposure ratio information 820. For example, the based on the SE pixel valid map, pixel values corresponding to a pixel suppressed from the stored SE compressed pixel values may be retrieved from an LE image, and/or memory 316. This retrieved pixel value may be adjusted based on a difference in exposure time between the exposure from where the retrieved pixel value came from and the SE image 302 exposure time. In some cases, this difference in exposure time may be expressed as an exposure ratio. For example, LE exposure may have an exposure time twice as long as the SE exposure. In some cases, a suppressed pixel value may be a reconstructed based on a product of a corresponding retrieved pixel value and the exposure ratio. For example, a suppressed SE pixel value may be reconstructed from a corresponding LE exposure pixel value with a 2× exposure ratio by multiplying the LE exposure pixel value by ½.

In some cases, rather than reconstructing suppressed pixel values, the image decompression engine 822A may, based on the SE pixel valid map, insert an indication to the HDR fusion engine 340 to use pixel values from other exposure images, such as the LE image 306. In some cases, this indication may be a minimum or maximum pixel value, or other value designated as the indication to the HDR fusion engine 340. In some cases, the image decompression engine 822A and the IP modules 332 may be configured to also ignore suppressed pixels and pass on the SE pixel valid map to the HDR fusion engine 340. Based on the SE pixel valid map, the HDR fusion engine 340 may use pixel values from other exposure images.

After the suppressed SE pixel values are reconstructed, the SE image 302 may be decompressed and a resulting decompressed SE image 302 may be input to one or more image processing (IP) modules 332. In some cases, after the one or more processing operations of IP modules 332 are performed, a post processed SE image 302 may be input to HDR fusion engine 340. In some cases, the HDR fusion engine 340 may combine/merge the decompressed, processed SE image 302 and the decompressed, processed LE image 306 into a single, fused HDR image. The fused HDR image may be input to one or more post fusion modules 342 for post-fusion processing operations. In some cases, after post processing operations, the image processor 330 may output the HDR image 350.

Similarly, the stored LE compressed pixel values and corresponding stored LE pixel valid map may be loaded from memory 316 by an image decompression engine 822B of the image processor 330. In some cases, the image decompression engine 822B may reconstruct suppressed pixel values based on the LE pixel valid map, corresponding (e.g., correlated) pixel values from other exposure images, and exposure ratio information 820. For example, the based on the LE pixel valid map, pixel values corresponding to a pixel suppressed from the stored LE compressed pixel values may be retrieved from an SE image, and/or memory 316 and the retrieved pixel value may be adjusted based on a difference in exposure time between the exposure from where the retrieved pixel value came from and the LE image 306 exposure time. For example, a suppressed LE pixel value may be reconstructed from a corresponding SE exposure pixel value with a 2× exposure ratio by multiplying the SE exposure pixel value by 2. After the suppressed LE pixel values are reconstructed, the LE image 306 may be decompressed and a resulting decompressed LE image 306 may be input to one or more IP modules 332.

In some cases, rather than reconstructing suppressed pixel values, the image decompression engine 822B may, based on the LE pixel valid map, insert an indication to the HDR fusion engine 340 to use pixel values from other exposure images, such as the SE image 306. In some cases, this indication may be a minimum or maximum pixel value, or other value designated as the indication to the HDR fusion engine 340. In some cases, the image decompression engine 822B and the IP modules 332 may be configured to also ignore suppressed pixels and pass on the LE pixel valid map to the HDR fusion engine 340. Based on the LE pixel valid map, the HDR fusion engine 340 may use pixel values from other exposure images.

In some cases, after the one or more processing operations of IP modules 332 are performed, a post processed LE image 306 may be input to HDR fusion engine 340. In some cases, the HDR fusion engine 340 may output a fused HDR image that may be input to one or more post fusion modules 342 for post-fusion processing operations. In some cases, after post processing operations, the image processor 330 may output the HDR image 350.

Figure 9:
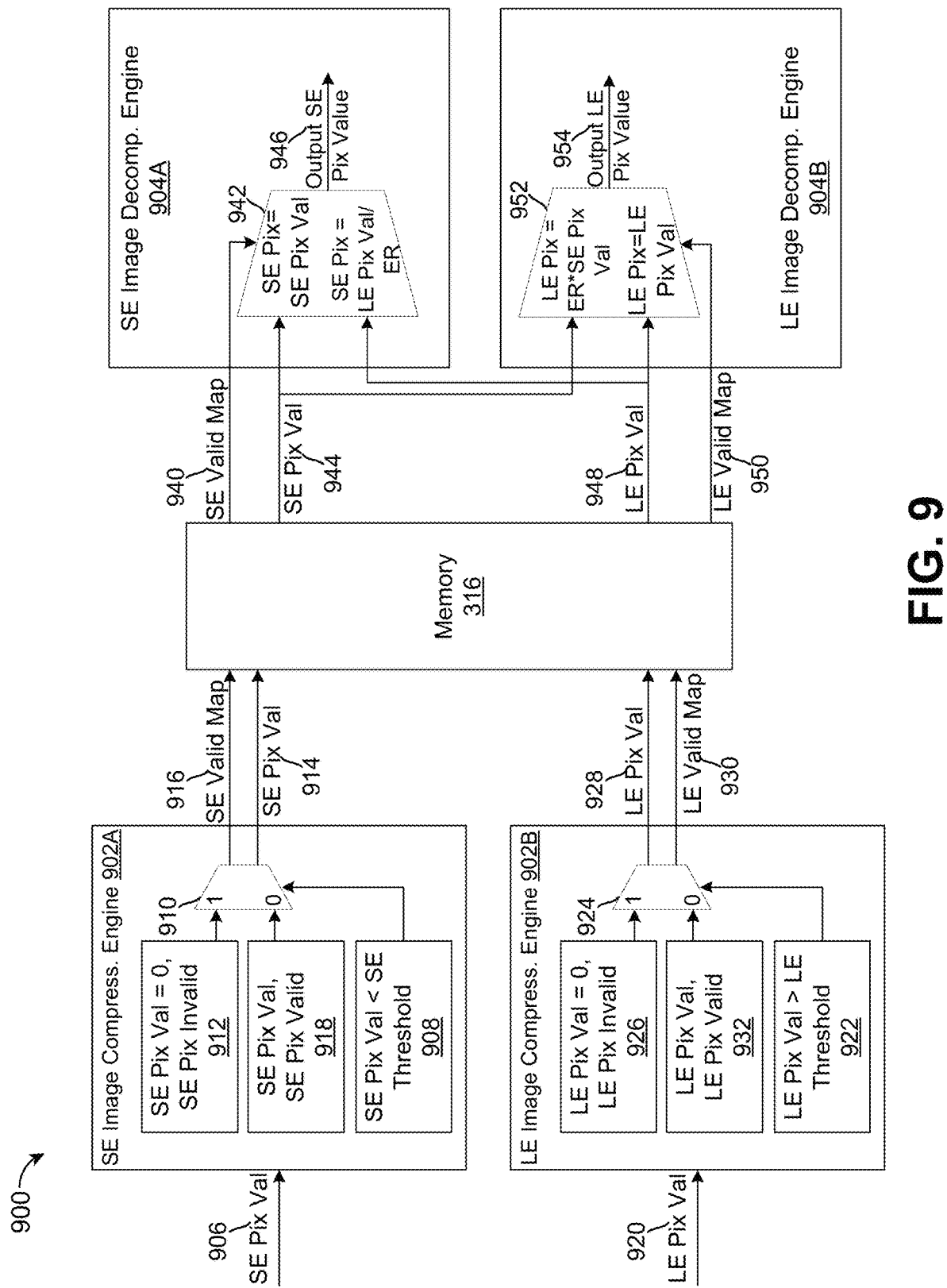
FIG. 9 is a diagram illustrating an example implementation for suppressing and reconstructing pixel values, in accordance with aspects of the present disclosure.

FIG. 9 is a diagram of an example system 900 for suppressing and reconstructing pixel values, in accordance with aspects of the present disclosure. The system 900 includes an SE image compression engine 902A, an LE image compression engine 902B, memory 316, an SE image decompression engine 904A, and an LE image decompression engine 904B. In some cases, memory 316 may be substantially similar to memory 316 of FIG. 2. In some cases, the SE image compression engine 902A may illustrate operations performed by image compression engine 714A of FIG. 7 and image compression engine 814A of FIG. 8. Similarly, LE image compression engine 902B may illustrate operations performed by image compression engine 714B of FIG. 7 and image compression engine 814B of FIG. 8. Similarly, SE image decompression engine 904A may illustrate operations performed by image decompression engine 722A of FIG. 7 and image decompression engine 822A of FIG. 8. Similarly, LE image decompression engine 904B may illustrate operations performed by image decompression engine 722B of FIG. 7 and image decompression engine 822B of FIG. 8.

In some cases, an SE pixel value 906 may be input to SE image compression engine 902A. At block 908, the SE pixel value 906 may be compared to the SE threshold value and results of this comparison may be input to a select line of mux 910. For example, if the SE pixel value 906 is less than the SE threshold value, a SE pix value of 0 (or no value) and an indication that the SE pixel is invalid may be selected, as shown in block 912. The SE pix value of 0 (or no value) may be output 914 to memory 316 for storage as a part of the SE image. The indication that the SE pixel is invalid may also be output 916 to memory 316 for storage with the SE pixel valid map.

As another example, if the SE pixel value is greater than the SE threshold value, the SE pix value 906 and an indication that the SE pixel is valid may be selected, as shown in block 918. The SE pix value 906 may be output 914 to memory 316 for storage as a part of the SE image. The indication that the SE pixel is valid may also be output 916 to memory 316 for storage with the SE pixel valid map.

In some cases, an LE pixel value 920 may be input to LE image compression engine 902B. At block 922, the LE pixel value 920 may be compared to the LE threshold value and results of this comparison may be input to a select line of mux 924. For example, if the LE pixel value 906 is greater than the SE threshold value, a SE pix value of 0 (or a maximum value or no value) and an indication that the LE pixel is invalid may be selected, as shown in block 926. The LE pix value of 0 (or no value) may be output 928 to memory 316 for storage as a part of the LE image. The indication that the LE pixel is invalid may also be output 930 to memory 316 for storage with the LE pixel valid map.

As another example, if the LE pixel value is less than the LE threshold value, the LE pix value 920 and an indication that the SE pixel is valid may be selected, as shown in block 932. The LE pix value 920 may be output 928 to memory 316 for storage as a part of the LE image. The indication that the LE pixel is valid may also be output 930 to memory 316 for storage with the LE pixel valid map.

In some cases, the SE image decompression engine 904A may retrieve an SE valid map for input 940 to a select line of mux 942 of the SE image decompression engine 904A. If the SE valid map indicates a corresponding SE pixel is valid, an SE pixel value inputted 944 from memory 316 may be selected for output as an output SE pixel value 946 by mux 942. If the input 940 SE valid map indicates a corresponding SE pixel is invalid, an LE pixel value input 948 to mux 942, corresponding to the SE pixel, may be selected. The LE pixel value may be divided by an exposure ratio as between the SE image and the LE image and output as an SE pixel value 946 by mux 942.

In some cases, the LE image decompression engine 904B may retrieve an LE valid map for input 950 to a select line of mux 952 of the LE image decompression engine 904B. If the LE valid map indicates a corresponding LE pixel is valid, an LE pixel value inputted 948 from memory 316 may be selected for output as an output LE pixel value 954 by mux 952. If the input 950 LE valid map indicates a corresponding LE pixel is invalid, an SE pixel value input 944 to mux 952, corresponding to the LE pixel, may be selected. The SE pixel value may be multiplied by an exposure ratio as between the SE image and the LE image and output as an LE pixel value 954 by mux 952.

In some cases, a system that generates an HDR image using three images with different exposures, such as system 700 of FIG. 7, may operate in a substantially similar manner to the example implementation of system 900. In some cases where an SE pixel value or LE pixel value may be reconstructed based on an ME pixel value, mux 942 and mux 952 may receive the ME pixel value and determine the SE pixel value or LE pixel value based on an exposure ratio as between the SE image and the ME image or between the LE image and the ME image. Operations on the ME image are omitted for clarity.

FIG. 10 illustrates an example implementation of the systems and techniques described herein for providing potential memory savings when suppressing and reconstructing pixel values, in accordance with aspects of the present disclosure. In FIG. 10, a set of pixels 1000 may include pixels which are suppressed 1002 and pixels which are valid 1004. For example, pixels P00, P01, and P05 are valid pixels 1004 in a first row of the set of pixels 1000, and pixels P02, P03, P04, P06, P07, P08, and P09 are suppressed in the first row of the set of pixels 1000. In some cases, the valid pixels 1004 may be placed in memory word, such as memory word0 1006 and memory word1 1008, while suppressed pixels 1002 may be omitted from being stored in memory. By only storing the valid pixels 1004 in memory, memory savings can be obtained.

FIG. 11 is a flow diagram for a process 1100 for processing image data, in accordance with aspects of the present disclosure. The process 1100 may be performed by a computing device (or apparatus) or a component (e.g., a chipset, codec, etc.) of the computing device, such as the image processing system 100 of FIG. 1, the system 700 of FIG. 7, the system 800 of FIG. 8, the system 900 of FIG. 9, a system or device including the computing device architecture 1200 of FIG. 12, or other device, system, or component thereof. The computing device may be a mobile device (e.g., a mobile phone), a network-connected wearable device such as a watch, an extended reality (XR) device such as a virtual reality (VR) device or augmented reality (AR) device, a vehicle or component or system of a vehicle, or other type of computing device. The operations of the process 1100 may be implemented as software components that are executed and run on one or more processors.

At block 1102, the computing device (or component thereof) may obtain a first image having a first exposure time and a second image having a second exposure time. The second exposure time may be greater than the first exposure time. The computing device (or component thereof) may motion correct at least the first image or the second image. In some cases, the pixel of the first image correspond to an under-exposed pixel of the first image, and wherein the second pixel of the second image correspond to an over-exposed pixel of the second image.

At block 1104, the computing device (or component thereof) may determine that a first pixel of the first image has a first pixel value below a first threshold value and/or that a second pixel of the second image has a second pixel value above a second threshold value. The computing device (or component thereof) may generate a pixel validity map based on the determination that the first pixel has a first pixel value below the first threshold value or that the second pixel has a second pixel value above the second threshold value.

At block 1106, the computing device (or component thereof) may suppress at least one of the first pixel or the second pixel based on the determination that the first pixel has a first pixel value below the first threshold value or that the second pixel has a second pixel value above the second threshold value to prevent storing the first pixel or the second pixel to the at least one memory. The computing device (or component thereof) may suppress the at least one of the first pixel or the second pixel by removing at least one of the first pixel or the second pixel.

At block 1108, the computing device (or component thereof) may replace the suppressed first pixel of the first image based on a third pixel value of a corresponding third pixel from a first additional image and/or may replace the suppressed second pixel of the second image based on a fourth pixel value of a corresponding fourth pixel from a second additional image. In some cases, the first additional image and the second additional image both comprise a third image having a third exposure time different from the first exposure time and the second exposure time. In some cases, the first additional image comprises the second image, and wherein the second additional image comprises the first image. The computing device (or component thereof) may adjust at least one of: the third pixel value based on an exposure ratio between the first image and the third image, or the fourth pixel value based on the exposure ratio between the second image and the third image. In some cases, replacing the suppressed first pixel or suppressed second pixel is based on the pixel validity map.

At block 1110, the computing device (or component thereof) may output the first image or the second image, the first image or the second image including the third pixel or the fourth pixel. The computing device (or component thereof) may generate a high dynamic range (HDR) image based on the first image and the second image.

FIG. 12 illustrates an example computing device architecture 1200 of an example computing device which can implement the various techniques described herein. In some examples, the computing device can include a mobile device, a wearable device, an extended reality device (e.g., a virtual reality (VR) device, an augmented reality (AR) device, or a mixed reality (MR) device), a personal computer, a laptop computer, a video server, a vehicle (or computing device of a vehicle), or other device. For example, the computing device architecture 1200 may include image processing system 100 of FIG. 1. The components of computing device architecture 1200 are shown in electrical communication with each other using connection 1205, such as a bus. The example computing device architecture 1200 includes a processing unit (CPU or processor) 1210 and computing device connection 1205 that couples various computing device components including computing device memory 1215, such as read only memory (ROM) 1220 and random access memory (RAM) 1225, to processor 1210.

Computing device architecture 1200 can include a cache of high-speed memory connected directly with, in close proximity to, or integrated as part of processor 1210. Computing device architecture 1200 can copy data from memory 1215 and/or the storage device 1230 to cache 1212 for quick access by processor 1210. In this way, the cache can provide a performance boost that avoids processor 1210 delays while waiting for data. These and other modules can control or be configured to control processor 1210 to perform various actions. Other computing device memory 1215 may be available for use as well. Memory 1215 can include multiple different types of memory with different performance characteristics. Processor 1210 can include any general purpose processor and a hardware or software service, such as service 1 1232, service 2 1234, and service 3 1236 stored in storage device 1230, configured to control processor 1210 as well as a special-purpose processor where software instructions are incorporated into the processor design. Processor 1210 may be a self-contained system, containing multiple cores or processors, a bus, memory controller, cache, etc. A multi-core processor may be symmetric or asymmetric.

To enable user interaction with the computing device architecture 1200, input device 1245 can represent any number of input mechanisms, such as a microphone for speech, a touch-sensitive screen for gesture or graphical input, keyboard, mouse, motion input, speech and so forth. Output device 1235 can also be one or more of a number of output mechanisms known to those of skill in the art, such as a display, projector, television, speaker device, etc. In some instances, multimodal computing devices can enable a user to provide multiple types of input to communicate with computing device architecture 1200. Communication interface 1240 can generally govern and manage the user input and computing device output. There is no restriction on operating on any particular hardware arrangement and therefore the basic features here may easily be substituted for improved hardware or firmware arrangements as they are developed.

Storage device 1230 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1225, read only memory (ROM) 1220, and hybrids thereof. Storage device 1230 can include services 1232, 1234, 1236 for controlling processor 1210. Other hardware or software modules are contemplated. Storage device 1230 can be connected to the computing device connection 1205. In one aspect, a hardware module that performs a particular function can include the software component stored in a computer-readable medium in connection with the necessary hardware components, such as processor 1210, connection 1205, output device 1235, and so forth, to carry out the function.

Aspects of the present disclosure are applicable to any suitable electronic device (such as security systems, smartphones, tablets, laptop computers, vehicles, drones, or other devices) including or coupled to one or more active depth sensing systems. While described below with respect to a device having or coupled to one light projector, aspects of the present disclosure are applicable to devices having any number of light projectors, and are therefore not limited to specific devices.

The term "device" is not limited to one or a specific number of physical objects (such as one smartphone, one controller, one processing system and so on). As used herein, a device may be any electronic device with one or more parts that may implement at least some portions of this disclosure. While the below description and examples use the term "device" to describe various aspects of this disclosure, the term "device" is not limited to a specific configuration, type, or number of objects. Additionally, the term "system" is not limited to multiple components or specific embodiments. For example, a system may be implemented on one or more printed circuit boards or other substrates, and may have movable or static components. While the below description and examples use the term "system" to describe various aspects of this disclosure, the term "system" is not limited to a specific configuration, type, or number of objects.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as flash memory, memory or memory devices, magnetic or optical disks, flash memory, USB devices provided with non-volatile memory, networked storage devices, compact disk (CD) or digital versatile disk (DVD), any suitable combination thereof, among others. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative Aspects of the Disclosure Include:

Aspect 1. An apparatus for processing image data, the apparatus comprising: at least one memory; and at least one processor coupled to the at least one memory and configured to: obtain a first image having a first exposure time and a second image having a second exposure time, wherein the second exposure time is greater than the first exposure time; determine at least one of: that a first pixel of the first image has a first pixel value below a first threshold value; or that a second pixel of the second image has a second pixel value above a second threshold value; suppress at least one of the first pixel or the second pixel based on the determination that the first pixel has a first pixel value below the first threshold value or that the second pixel has a second pixel value above the second threshold value to prevent storing the first pixel or the second pixel to the at least one memory; replace at least one of: the suppressed first pixel of the first image based on a third pixel value of a corresponding third pixel from a first additional image; or the suppressed second pixel of the second image based on a fourth pixel value of a corresponding fourth pixel from a second additional image; and output the first image or the second image, the first image or the second image including the third pixel or the fourth pixel.

Aspect 2. The apparatus of aspect 1, wherein, to suppress the at least one of the first pixel or the second pixel, the at least one processor is further configured to remove at least one of the first pixel or the second pixel.

Aspect 3. The apparatus of any one of aspects 1 or 2, wherein the first additional image and the second additional image both comprise a third image having a third exposure time different from the first exposure time and the second exposure time.

Aspect 4. The apparatus of any one of aspects 1 to 3, wherein the first additional image comprises the second image, and wherein the second additional image comprises the first image.

Aspect 5. The apparatus of any one of aspects 1 to 4, wherein the at least one processor is further configured to adjust at least one of: the third pixel value based on an exposure ratio between the first image and the third image, or the fourth pixel value based on the exposure ratio between the second image and the third image.

Aspect 6. The apparatus of any one of aspects 1 to 5, wherein the at least one processor is further configured to motion correct at least the first image or the second image.

Aspect 7. The apparatus of any one of aspects 1 to 6, wherein the pixel of the first image correspond to an under-exposed pixel of the first image, and wherein the second pixel of the second image correspond to an over-exposed pixel of the second image.

Aspect 8. The apparatus of any one of aspects 1 to 7, wherein the at least one processor is further configured to generate a pixel validity map based on the determination that the first pixel has a first pixel value below the first threshold value or that the second pixel has a second pixel value above the second threshold value.

Aspect 9. The apparatus of aspect 8, wherein replacing the suppressed first pixel or suppressed second pixel is based on the pixel validity map.

Aspect 10. The apparatus of any one of aspects 1 to 9, wherein the at least one processor is configured to generate a high dynamic range (HDR) image based on the first image and the second image.

Aspect 11. A method for processing image data, the method comprising: obtaining a first image having a first exposure time and a second image having a second exposure time, wherein the second exposure time is greater than the first exposure time; determining at least one of: that a first pixel of the first image has a first pixel value below a first threshold value; or that a second pixel of the second image has a second pixel value above a second threshold value; suppressing at least one of the first pixel or the second pixel based on the determination that the first pixel has a first pixel value below the first threshold value or that the second pixel has a second pixel value above the second threshold value to prevent storing the first pixel or the second pixel; replacing at least one of: the suppressed first pixel of the first image based on a third pixel value of a corresponding third pixel from a first additional image; or the suppressed second pixel of the second image based on a fourth pixel value of a corresponding fourth pixel from a second additional image; and outputting the first image or the second image, the first image or the second image including the third pixel or the fourth pixel.

Aspect 12. The method of aspect 11, wherein suppressing the at least one of the first pixel or the second pixel comprises removing at least one of the first pixel or the second pixel.

Aspect 13. The method of any one of aspects 11 or 12, wherein the first additional image and the second additional image both comprise a third image having a third exposure time different from the first exposure time and the second exposure time.

Aspect 14. The method of any one of aspects 11 to 13, wherein the first additional image comprises the second image, and wherein the second additional image comprises the first image.

Aspect 15. The method of any one of aspects 11 to 14, further comprising adjusting at least one of: the third pixel value based on an exposure ratio between the first image and the third image, or the fourth pixel value based on the exposure ratio between the second image and the third image.

Aspect 16. The method of any one of aspects 11 to 15, further comprising motion correcting at least the first image or the second image.

Aspect 17. The method of any one of aspects 11 to 16, wherein the pixel of the first image correspond to an under-exposed pixel of the first image, and wherein the second pixel of the second image correspond to an over-exposed pixel of the second image.

Aspect 18. The method of any one of aspects 11 to 17, further comprising generating a pixel validity map based on the determination that the first pixel has a first pixel value below the first threshold value or that the second pixel has a second pixel value above the second threshold value.

Aspect 19. The method of aspect 18, wherein replacing the suppressed first pixel or suppressed second pixel is based on the pixel validity map.

Aspect 20. The method of any one of aspects 11 to 19, further comprising generating a high dynamic range (HDR) image based on the first image and the second image.

Aspect 21. A non-transitory computer-readable medium having stored thereon instructions that, when executed by at least one processor, cause the at least one processor to: obtain a first image having a first exposure time and a second image having a second exposure time, wherein the second exposure time is greater than the first exposure time; determine at least one of: that a first pixel of the first image has a first pixel value below a first threshold value; or that a second pixel of the second image has a second pixel value above a second threshold value; suppress at least one of the first pixel or the second pixel based on the determination that the first pixel has a first pixel value below the first threshold value or that the second pixel has a second pixel value above the second threshold value to prevent storing the first pixel or the second pixel to a memory; replace at least one of: the suppressed first pixel of the first image based on a third pixel value of a corresponding third pixel from a first additional image; or the suppressed second pixel of the second image based on a fourth pixel value of a corresponding fourth pixel from a second additional image; and output the first image or the second image, the first image or the second image including the third pixel or the fourth pixel.

Aspect 22. The non-transitory computer-readable medium of aspect 21, wherein, to suppress the at least one of the first pixel or the second pixel, the instructions further cause the at least one processor to remove at least one of the first pixel or the second pixel.

Aspect 23. The non-transitory computer-readable medium of any one of aspects 21 or 22, wherein the first additional image and the second additional image both comprise a third image having a third exposure time different from the first exposure time and the second exposure time.

Aspect 24. The non-transitory computer-readable medium of any one of aspects 21 to 23, wherein the first additional image comprises the second image, and wherein the second additional image comprises the first image.

Aspect 25. The non-transitory computer-readable medium of any one of aspects 21 to 24, wherein the instructions further cause the at least one processor to adjust at least one of: the third pixel value based on an exposure ratio between the first image and the third image, or the fourth pixel value based on the exposure ratio between the second image and the third image.

Aspect 26. The non-transitory computer-readable medium of any one of aspects 21 to 25, wherein the instructions further cause the at least one processor to motion correct at least the first image or the second image.

Aspect 27. The non-transitory computer-readable medium of any one of aspects 21 to 26, wherein the pixel of the first image correspond to an under-exposed pixel of the first image, and wherein the second pixel of the second image correspond to an over-exposed pixel of the second image.

Aspect 28. The non-transitory computer-readable medium of any one of aspects 21 to 27, wherein the instructions further cause the at least one processor to generate a pixel validity map based on the determination that the first pixel has a first pixel value below the first threshold value or that the second pixel has a second pixel value above the second threshold value.

Aspect 29. The non-transitory computer-readable medium of aspect 28, wherein replacing the suppressed first pixel or suppressed second pixel is based on the pixel validity map.

Aspect 30. The non-transitory computer-readable medium of any one of aspects 21 to 29, wherein the instructions further cause the at least one processor to generate a high dynamic range (HDR) image based on the first image and the second image.

Aspect 31. An apparatus for processing image data, the apparatus comprising one or more means for performing operations according to any of Aspects 1 to 30.

What is claimed is:

1. An apparatus for processing image data, the apparatus comprising:
    at least one memory; and
    at least one processor coupled to the at least one memory and configured to:
        obtain a first image having a first exposure time and a second image having a second exposure time, wherein the second exposure time is greater than the first exposure time;
        determine at least one of:
            that a first pixel of the first image has a first pixel value below a first threshold value; or
            that a second pixel of the second image has a second pixel value above a second threshold value;
        suppress at least one of the first pixel or the second pixel based on a determination that at least one of the first pixel has the first pixel value below the first threshold value or the second pixel has the second pixel value above the second threshold value to prevent storing the first pixel or the second pixel to the at least one memory;
        replace at least one of:
            the suppressed first pixel of the first image based on a third pixel value of a corresponding third pixel from a first additional image; or
            the suppressed second pixel of the second image based on a fourth pixel value of a corresponding fourth pixel from a second additional image; and
        output the first image or the second image, the first image or the second image including the third pixel or the fourth pixel.

2. The apparatus of claim 1, wherein, to suppress the at least one of the first pixel or the second pixel, the at least one processor is further configured to remove at least one of the first pixel or the second pixel.

3. The apparatus of claim 1, wherein the first additional image and the second additional image both comprise a third image having a third exposure time different from the first exposure time and the second exposure time.

4. The apparatus of claim 1, wherein the first additional image comprises the second image, and wherein the second additional image comprises the first image.

5. The apparatus of claim 1, wherein the at least one processor is further configured to adjust the third pixel value based on an exposure ratio between the first image and the second image.

6. The apparatus of claim 1, wherein the at least one processor is further configured to motion correct at least the first image or the second image.

7. The apparatus of claim 1, wherein the first pixel of the first image corresponds to an under-exposed pixel of the first image, and wherein the second pixel of the second image corresponds to an over-exposed pixel of the second image.

8. The apparatus of claim 1, wherein the at least one processor is further configured to generate a pixel validity map based on a determination that the first pixel has the first pixel value below the first threshold value or that the second pixel has the second pixel value above the second threshold value.

9. The apparatus of claim 8, wherein replacing the suppressed first pixel or suppressed second pixel is based on the pixel validity map.

10. The apparatus of claim 1, wherein the at least one processor is configured to generate a high dynamic range (HDR) image based on the first image and the second image.

11. A method for processing image data, the method comprising:
    obtaining a first image having a first exposure time and a second image having a second exposure time, wherein the second exposure time is greater than the first exposure time;
    determining at least one of:
        that a first pixel of the first image has a first pixel value below a first threshold value; or
        that a second pixel of the second image has a second pixel value above a second threshold value;
    suppressing at least one of the first pixel or the second pixel based on a determination that at least one of the first pixel has the first pixel value below the first threshold value or the second pixel has the second pixel value above the second threshold value to prevent storing the first pixel or the second pixel;

replacing at least one of:
    the suppressed first pixel of the first image based on a third pixel value of a corresponding third pixel from a first additional image; or
    the suppressed second pixel of the second image based on a fourth pixel value of a corresponding fourth pixel from a second additional image; and
outputting the first image or the second image, the first image or the second image including the third pixel or the fourth pixel.

12. The method of claim 11, wherein the suppressing the at least one of the first pixel or the second pixel comprises removing at least one of the first pixel or the second pixel.

13. The method of claim 11, wherein the first additional image and the second additional image both comprise a third image having a third exposure time different from the first exposure time and the second exposure time.

14. The method of claim 11, wherein the first additional image comprises the second image, and wherein the second additional image comprises the first image.

15. The method of claim 11, further comprising adjusting the third pixel value based on an exposure ratio between the first image and the second image.

16. The method of claim 11, further comprising motion correcting at least the first image or the second image.

17. The method of claim 11, wherein the first pixel of the first image corresponds to an under-exposed pixel of the first image, and wherein the second pixel of the second image corresponds to an over-exposed pixel of the second image.

18. The method of claim 11, further comprising generating a pixel validity map based on a determination that the first pixel has the first pixel value below the first threshold value or that the second pixel has the second pixel value above the second threshold value.

19. The method of claim 18, wherein the replacing the suppressed first pixel or suppressed second pixel is based on the pixel validity map.

20. The method of claim 11, further comprising generating a high dynamic range (HDR) image based on the first image and the second image.

21. A non-transitory computer-readable medium having stored thereon instructions that, when executed by at least one processor, cause the at least one processor to:
    obtain a first image having a first exposure time and a second image having a second exposure time, wherein the second exposure time is greater than the first exposure time;
    determine at least one of:
        that a first pixel of the first image has a first pixel value below a first threshold value; or
        that a second pixel of the second image has a second pixel value above a second threshold value;
    suppress at least one of the first pixel or the second pixel based on a determination that at least one of the first pixel has the first pixel value below the first threshold value or the second pixel has the second pixel value above the second threshold value to prevent storing the first pixel or the second pixel to a memory;
    replace at least one of:
        the suppressed first pixel of the first image based on a third pixel value of a corresponding third pixel from a first additional image; or
        the suppressed second pixel of the second image based on a fourth pixel value of a corresponding fourth pixel from a second additional image; and
    output the first image or the second image, the first image or the second image including the third pixel or the fourth pixel.

22. The non-transitory computer-readable medium of claim 21, wherein, to suppress the at least one of the first pixel or the second pixel, the instructions further cause the at least one processor to remove at least one of the first pixel or the second pixel.

23. The non-transitory computer-readable medium of claim 21, wherein the first additional image and the second additional image both comprise a third image having a third exposure time different from the first exposure time and the second exposure time.

24. The non-transitory computer-readable medium of claim 21, wherein the first additional image comprises the second image, and wherein the second additional image comprises the first image.

25. The non-transitory computer-readable medium of claim 21, wherein the instructions further cause the at least one processor to adjust the third pixel value based on an exposure ratio between the first image and the second image.

26. The non-transitory computer-readable medium of claim 21, wherein the instructions further cause the at least one processor to motion correct at least the first image or the second image.

27. The non-transitory computer-readable medium of claim 21, wherein the first pixel of the first image corresponds to an under-exposed pixel of the first image, and wherein the second pixel of the second image corresponds to an over-exposed pixel of the second image.

28. The non-transitory computer-readable medium of claim 21, wherein the instructions further cause the at least one processor to generate a pixel validity map based on a determination that the first pixel has the first pixel value below the first threshold value or that the second pixel has the second pixel value above the second threshold value.

29. The non-transitory computer-readable medium of claim 28, wherein replacing the suppressed first pixel or suppressed second pixel is based on the pixel validity map.

30. The non-transitory computer-readable medium of claim 21, wherein the instructions further cause the at least one processor to generate a high dynamic range (HDR) image based on the first image and the second image.

* * * * *